United States Patent
Yoshimi

(10) Patent No.: US 8,687,896 B2
(45) Date of Patent: Apr. 1, 2014

(54) PICTURE IMAGE PROCESSOR, METHOD FOR PROCESSING PICTURE IMAGE AND METHOD FOR PROCESSING PICTURE IMAGE

(75) Inventor: Kousuke Yoshimi, Tokyo (JP)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 13/321,900

(22) PCT Filed: Jun. 1, 2010

(86) PCT No.: PCT/JP2010/059238
§ 371 (c)(1),
(2), (4) Date: Nov. 22, 2011

(87) PCT Pub. No.: WO2010/140578
PCT Pub. Date: Dec. 9, 2010

(65) Prior Publication Data
US 2012/0070088 A1     Mar. 22, 2012

(30) Foreign Application Priority Data
Jun. 2, 2009   (JP) ................................ 2009-133223

(51) Int. Cl.
*G06K 9/48*     (2006.01)
(52) U.S. Cl.
USPC ........................................................ 382/199
(58) Field of Classification Search
USPC .................. 382/103, 104, 107, 199, 305, 218
See application file for complete search history.

(56) References Cited

U.S. PATENT DOCUMENTS

| | | | | |
|---|---|---|---|---|
| 7,948,397 | B2 * | 5/2011 | Nakamura et al. | 340/903 |
| 8,305,445 | B2 * | 11/2012 | Mori | 348/148 |
| 2010/0110193 | A1 * | 5/2010 | Kobayashi | 348/149 |

FOREIGN PATENT DOCUMENTS

| | | |
|---|---|---|
| JP | 7-302346 A | 11/1995 |
| JP | 2003168198 A | 6/2003 |
| JP | 2003308534 A | 10/2003 |
| JP | 2009009331 A | 1/2009 |

OTHER PUBLICATIONS

Computer-English translation of Japanese Patent No. JP-2009-009331 (Aragaki), (pp. 1-19).*
International Search Report for PCT/JP2010/059238 mailed Jul. 6, 2010.
G. Welch et al., "An Introduction to the Kalman Filter", UNC-Chapel Hill; TR95-041, Jul. 24, 2006, pp. 1-16.

* cited by examiner

Primary Examiner — Daniel Mariam

(57) ABSTRACT

A picture image processing apparatus includes a candidate detection unit that detects a lateral boundary line candidate and a paint-blank boundary line candidate from the picture image information acquired, and a verification unit that verifies whether or not the lateral boundary line candidate etc. detected is the lateral boundary line etc.; a storage unit that memorizes, as hysteresis information, verification information including the lateral boundary line etc. in case the lateral boundary line candidate etc. detected has been verified to be a lateral boundary line etc. The storage unit also memorizes car speed information associated with the hysteresis information. The apparatus further includes an estimation unit that, using the hysteresis information and the car speed information, estimates positions of the lateral boundary line etc. in a next frame. The storage unit memorizes the estimation information including the position in the next frame of the lateral boundary line position etc. estimated. The verification unit uses the estimation information memorized at a time point of estimation in the storage unit to execute verification.

24 Claims, 13 Drawing Sheets

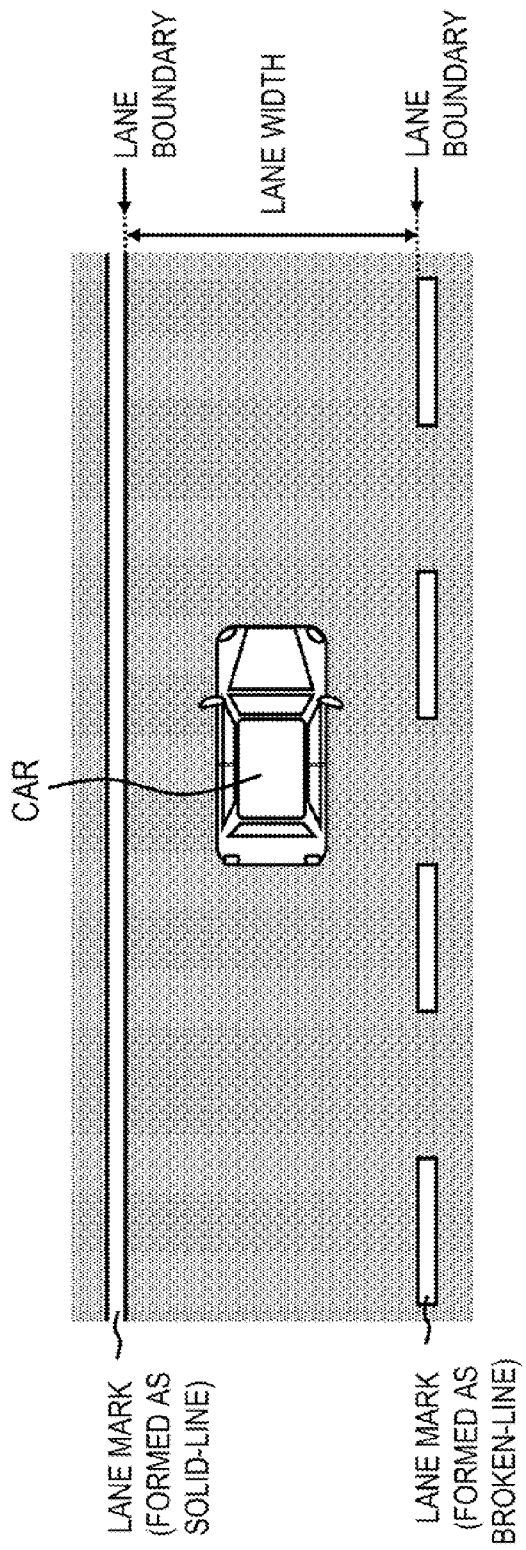
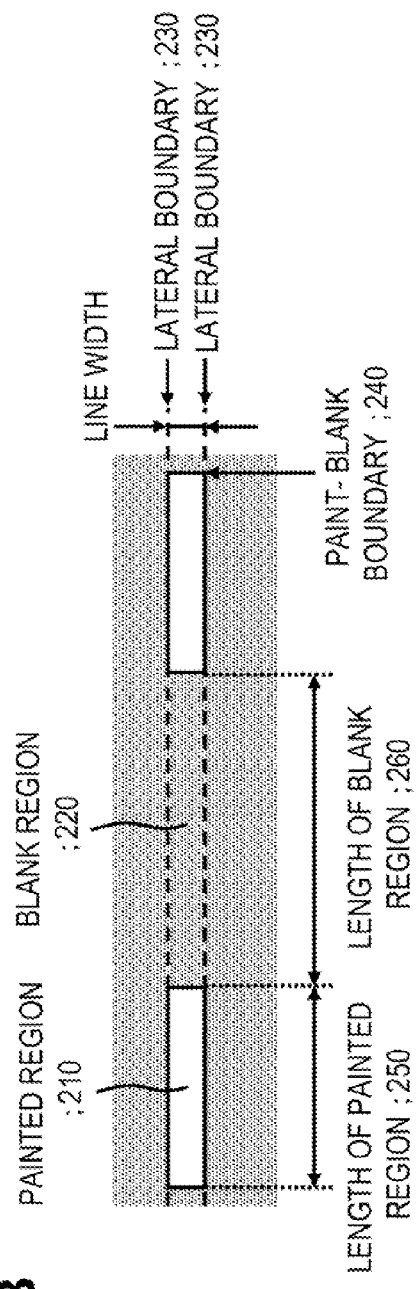

CAMERA PICTURE IMAGE COORDINATE SYSTEM

OVERVIEW PICTURE IMAGE COORDINATE SYSTEM

FIG. 5A  (EXAMPLE 1)
PICTURE IMAGE INFORMATION
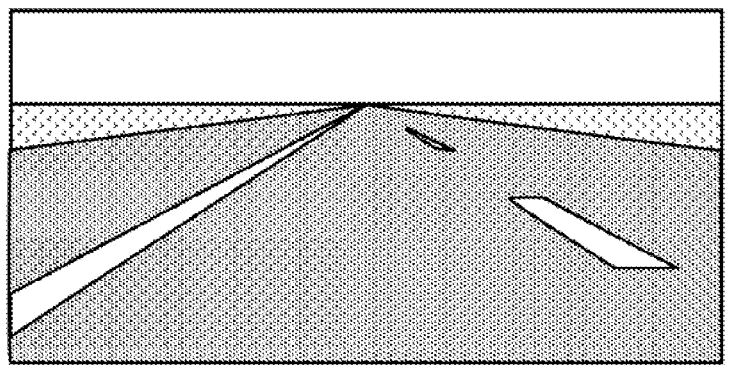
FIG. 5B  (EXAMPLE 1)
IMAGERY OF EXTRACTION OF EDGE POINTS IN THE TRANSVERSE DIRECTION
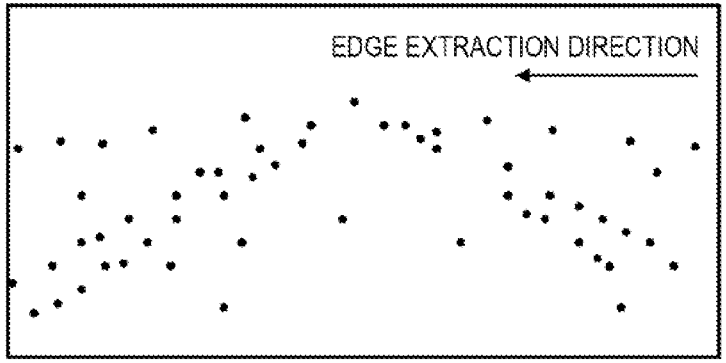
FIG. 5C  (EXAMPLE 1)
IMAGERY OF EXTRACTION OF LATERAL BOUNDARY LINE CANDIDATES
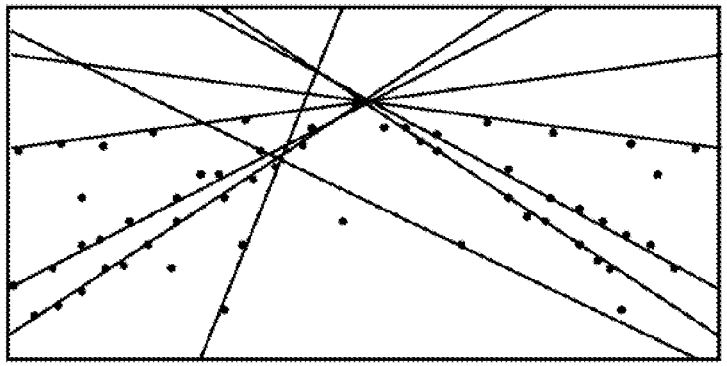

FIG. 6A (EXAMPLE 1)
IMAGERY OF EXTRACTION OF LATERAL BOUNDARY LINE CANDIDATES
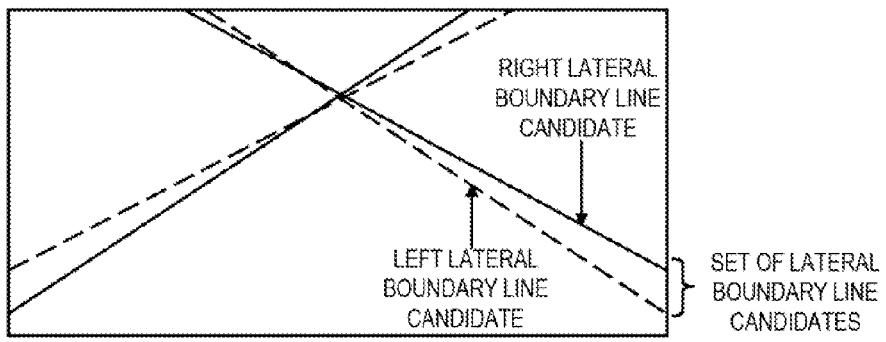
FIG. 6B (EXAMPLE 1)
IMAGERY OF EXTRACTION OF EDGE POINTS IN THE LONGITUDINAL DIRECTION
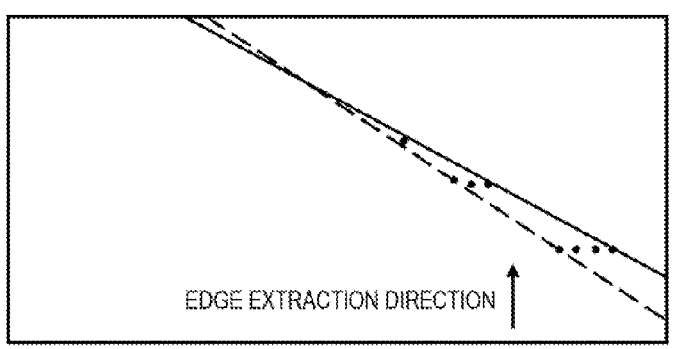
FIG. 6C (EXAMPLE 1)
IMAGERY OF EXTRACTION OF PAINT- BLANK BOUNDARY LINE CANDIDATES
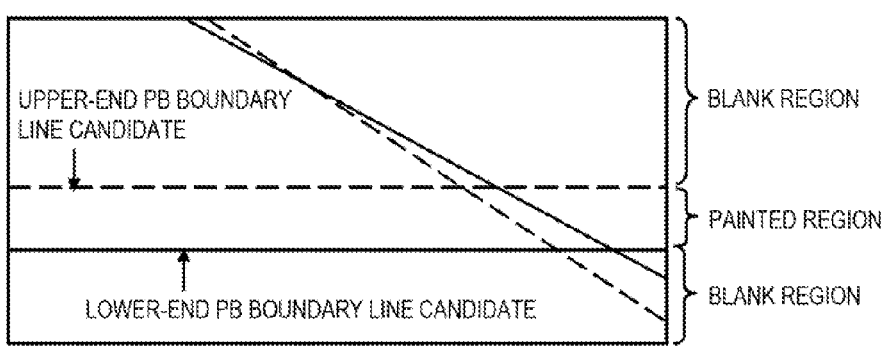

FIG. 12 (COMPARATIVE EXAMPLE)

PICTURE IMAGE PROCESSOR, METHOD FOR PROCESSING PICTURE IMAGE AND METHOD FOR PROCESSING PICTURE IMAGE

REFERENCE TO RELATED APPLICATION

This application is based upon and claims the benefit of the priority of Japanese patent application No. 2009-133223 filed on Jun. 2, 2009, the disclosure of which is incorporated herein in its entirety by reference thereto.

TECHNICAL FIELD

This invention relates to an apparatus, a method and a program for processing a picture image. More particularly, it relates to an apparatus, a method and a program for processing a picture image, used for recognizing a lane mark pained on a road surface.

BACKGROUND

Among the techniques of recognizing a lane mark (white line) as painted on a road surface, there is, for example, a technique disclosed in Patent Document 1. In this white line detection method, such pixels experiencing significant lightness changes are selected in a picture image of the road surface as captured by an image pickup unit. Out of these pixels, those that are within a preset zone proximate to the car and whose coordinates are located on a straight line are extracted and the straight line is concluded to be an edge of the white line. Using, as a start point, the last one of the pixels that make up the above straight line, the next pixel is searched within a preset range of the picture image in a direction away from the car. The pixels as searched in such range are decided to be the edge of the next white line.
Patent Document 1:
JP Patent Kokai Publication No. JP-A-7-302346
Non-Patent Document 1:
Greg Welch and Gary Bishop, An Introduction to the Kalman Filter, UNC-Chapel Hill, TR95-041, Jul. 24, 2006

SUMMARY

The entirety of disclosed contents of the above Patent Document and the Non-Patent Document is incorporated by reference herein. The following analysis is afforded by the present invention.
If, in the white line detection method, disclosed in Patent Document 1, a white line in a broken line configuration is to be detected, there is a risk that an object other than a lane mark is detected as being a lane mark around a blank region of the lane mark. It is observed that the lane mark is in the shape of a broken line and has a periodic or regular pattern of individual separate line segments. In a picture image acquired by an imaging unit loaded on a running car, there are cases where the lane mark is partially not represented in the picture image given the presence of the blank region in the white line in the broken line shape. The white line detection method, disclosed in Patent Document 1, is premised on the lane mark, such as a white line, being detected for all time in the picture image. There is thus a risk that marked changes in luminance caused by, for example, an outer edge of a car running on a neighboring lane, are mistakenly detected as the edge of the white line.

It is therefore a principal object of the present invention to provide an apparatus, a method and a program for processing a picture image, used for recognizing a lane mark in the form of a broken line, painted on a road surface, according to which the chance of mistaken recognition may be decreased to realize stable recognition performance.

In one aspect of the present invention, a picture image processing apparatus (lane mark recognition apparatus) includes a candidate detection unit detecting a lateral boundary line candidate and a paint-blank boundary line candidate of a lane mark from the picture image information acquired. The apparatus also includes a verification unit verifying whether the lateral boundary line candidate and the paint-blank boundary line candidate, detected by the candidate detection unit, represent a lateral boundary line and a paint-blank boundary line of the lane mark, respectively. The apparatus also includes a storage unit memorizing the verification information, as hysteresis information including the lateral boundary line candidate and the paint-blank boundary line candidate, at a time at which the lateral boundary line candidate and the paint-blank boundary line candidate have been verified by the verification unit to be the lateral boundary line and the paint-blank boundary line of the lane mark, respectively. The storage unit also memorizes car speed information correlated with the hysteresis information. The apparatus also includes an estimation unit estimating, using the hysteresis information and the car speed information, positions of the lateral boundary line and the paint-blank boundary line in a next frame corresponding to picture image information which would be acquired next to current picture image information. The storage unit memorizes the estimation information including the positions of the lateral boundary line and the paint-blank boundary line estimated by the estimation unit, and the verification unit executes verification using the estimation information memorized in the storage unit at a time point of the verification.

In the picture image processing apparatus of the present invention, the candidate detection unit preferably includes a lateral boundary line candidate detection unit detecting a set of the lateral boundary line candidates from the picture image information, and a paint-blank boundary line candidate detection unit. The paint-blank boundary line candidate detection unit preferably detects the paint-blank boundary line candidate from the picture image information in a region of the set of the lateral boundary line candidates detected by the lateral boundary line candidate detection unit.

In the picture image processing apparatus of the present invention, the lateral boundary line candidate detection unit preferably calculates gradient(s) of luminance value(s) in the picture image information with the use of an edge filter. The lateral boundary line candidate detection unit preferably compares absolute value(s) of the gradient(s) to a preset threshold value to extract, as edge points, a plurality of points in each of which the absolute values of the gradient are not less than the preset threshold value. The lateral boundary line candidate detection unit preferably extracts, by Hough transform, a plurality of approximate straight lines passing through the edge points as contacting points. The lateral boundary line candidate detection unit preferably executes preset evaluation processing on the approximate straight lines extracted to detect two of the approximate straight lines as the set of the lateral boundary line candidates. The paint-blank boundary line candidate detection unit preferably calculates gradient(s) of another luminance value(s) in the picture image information with the use of an edge filter. The paint-blank boundary line candidate detection unit preferably compares an absolute value(s) of the gradient(s) to another preset threshold value to extract, as edge points, a plurality of points in each of which the absolute values of the gradient(s) are not less than the preset other threshold value. The paint-blank boundary line candidate detection unit preferably extracts, from the proximal side, two of the approximate straight lines passing through the edge points as contacting points by Hough transform, and detects the two approximate straight lines extracted as the paint-blank boundary line candidates.

In the picture image processing apparatus of the present invention, the verification unit preferably compares the estimated positions of the lateral boundary line as well as the paint-blank boundary line in the estimation information memorized in the storage unit at a time point of verification to the candidate positions of the lateral boundary line candidate and the paint-blank boundary line candidate to decide an evaluation value(s). The verification unit preferably decides whether the evaluation value(s) is not less than a further threshold value. The verification unit preferably verifies the lateral boundary line candidate as well as the paint-blank boundary line candidate to be a lane mark in case the evaluation value(s) is not less than the further threshold value(s).

In the picture image processing apparatus according to the present invention, the verification unit preferably verifies the lateral boundary line candidate as well as the paint-blank boundary line candidate to be not a lane mark when the evaluation value(s) is less than the further threshold values.

In the picture image processing apparatus according to the Present invention, the verification unit preferably executes verification by decreasing the threshold value in case the verification results in keeping on to be not a lane mark despite a preset time has elapsed or the car has run a preset distance.

In the picture image processing apparatus according to the present invention, the evaluation value is preferably decided by normal distribution having the estimated position as μ. The verification unit preferably executes the verification by increasing a variance of the normal distribution in case the verification results in keeping on to be not a lane mark despite a preset time has elapsed or the car has run a preset distance.

In the picture image processing apparatus according to the present invention, the storage unit preferably memorizes advance information including a line width of a lane mark, a length of a painted region and a length of a blank region. The verification unit preferably executes verification using the advance information in case no estimated information has been memorized in the storage unit at a time point of the verification.

In another aspect of the present invention, a method for processing a picture image includes detecting a lateral boundary line candidate and a paint-blank boundary line candidate of a lane mark from picture image information acquired. The method also includes verifying whether the lateral boundary line candidate and the paint-blank boundary line candidate detected represent a lateral boundary line and a paint-blank boundary line of the lane mark, respectively. The method also includes memorizing verification information as hysteresis information. The verification information includes the lateral boundary line candidate and the paint-blank boundary line candidate, at a time at which the lateral boundary line candidate and the paint-blank boundary line candidate have been verified to be the lateral boundary line and the paint-blank boundary line of the lane mark, respectively. The storage unit also memorizes car speed information correlated with the hysteresis information. The method also includes estimating, with the aid of the hysteresis information and the car speed information, positions of the lateral boundary line and the paint-blank boundary line in a next frame corresponding to picture image information which would be acquired next to current picture image information. The method also includes memorizing the estimation information including the positions in the next frame of the lateral boundary line and the paint-blank boundary line estimated. The method further includes, in verifying whether the lateral boundary line candidate and the point-blank boundary line candidate represent the lateral boundary line and the paint-blank boundary line of the lane mark, respectively, executing verification using the estimation information memorized in the storage unit at a time point of the verification.

The method for processing a picture image according to the present invention further includes, in verifying whether or not the lateral boundary line candidate and the paint-blank boundary line candidate are a lateral boundary line and a paint-blank boundary line of the lane mark, respectively, detecting a set of the lateral boundary line candidates from the picture image information, and detecting paint-blank boundary candidate from the picture image information in a region of the set of the lateral boundary line candidates detected.

The method for processing a picture image according to the present invention preferably further includes, in detecting the set of the lateral boundary line candidates, calculating a gradient of a luminance value in the picture image information with the use of an edge filter. The method preferably further includes comparing an absolute value of the gradient to a preset threshold value to extract, as edge points, a plurality of points in each of which absolute values of the gradients are not less than the preset threshold value. The method preferably further includes extracting, by Hough transform, a plurality of approximate straight lines passing through the edge points as contacting points, and executing preset evaluation processing on the approximate straight lines extracted to detect two of the approximate straight lines as the set of the lateral boundary line candidates. The method preferably further includes, in detecting the paint-blank region boundary candidate: calculating a gradient of another luminance value in the picture image information with the use of an edge filter. The method also preferably further includes comparing an absolute value of the gradient to another preset threshold value to extract, as edge points, a plurality of points in each of which absolute values of the gradient are not less than the preset another threshold value. The method also preferably further includes extracting, from a proximal side, two of a plurality of approximate straight lines passing through the edge points as contacting points by Hough transform, and detecting the two approximate straight lines extracted as the paint-blank boundary line candidates.

The method for processing a picture image according to the present invention preferably further includes, in verifying whether or not the lateral boundary line candidate and the paint-blank boundary line candidate are a lateral boundary line or a paint-blank boundary line of the lane mark, respectively: comparing estimated positions of the lateral boundary line or the paint-blank boundary line in estimation information memorized at a time point of verification to candidate positions of the lateral boundary line candidate and the paint-blank boundary line candidate to decide an evaluation value, respectively. The method preferably further includes deciding whether or not the evaluation value(s) is not less than a further threshold value, and verifying the lateral boundary line candidate and the paint-blank boundary line candidate to be a lane mark, respectively, in case the evaluation value(s) is not less than the further threshold value.

The method for processing a picture image according to the present invention further includes, in verifying whether or not the lateral boundary line candidate and the paint-blank boundary line candidate are a lateral boundary line and a paint-blank boundary line of a lane mark, respectively, verifying the lateral boundary line candidate and the paint-blank boundary line candidate to be not a lane mark when the evaluation value(s) is less than the further threshold value.

The method for processing a picture image according to the present invention preferably further includes, in verifying whether or not a lateral boundary line candidate and a paint-blank boundary line candidate are a lateral boundary line and a paint-blank boundary line of a lane mark, respectively, executing verification by decreasing the threshold value in case the verification results in keeping on to be not a lane mark despite a preset time has elapsed or the car has run a preset distance.

In the method for processing a picture image according to the present invention, the evaluation value is decided by normal distribution having the estimated position as μ. The method preferably further includes, in verifying whether or not the lateral boundary line candidate and a paint-blank boundary line candidate are a lateral boundary line and a paint-blank boundary line of a lane mark, respectively, executing the verification by increasing variance of the normal distribution in case the verification results in keeping on to be not a lane mark despite a preset time has elapsed or the car has run a preset distance.

The method for processing a picture image according to the present invention preferably further includes, in verifying whether the lateral boundary line candidate and a paint-blank boundary line candidate are a lateral boundary line and a paint-blank boundary line of a lane mark, respectively, executing verification using advance information inclusive of a line width of a lane mark, a length of a painted region and a length of a blank region in case no estimated information has been memorized at a time point of the verification.

In yet another aspect of the present invention, a program for processing a picture image allows a computer to execute the processing of detecting a lateral boundary line candidate and a paint-blank boundary line candidate of a lane mark from the picture image information acquired. The program also allows a computer to execute processing of verifying whether or not a lateral boundary line candidate and a paint-blank boundary line candidate detected represent a lateral boundary line and a paint-blank boundary line of the lane mark, respectively, and processing of memorizing the verification information, as hysteresis information. The verification information includes a lateral boundary line candidate and a paint-blank boundary line candidate at a time at which the lateral boundary line candidate and the paint-blank boundary line candidate have been verified to be a lateral boundary line and a paint-blank boundary line of the lane mark, respectively. The program also allows a computer to execute the processing of memorizing the car speed information correlated with the hysteresis information, and processing of estimating, using the hysteresis information and the car speed information, positions of the lateral boundary line and the paint-blank boundary line in a next frame corresponding to picture image information which would be acquired next to a current picture image information. The program also allows a computer to execute processing of memorizing the estimation information including positions of the lateral boundary line and the paint-blank boundary line of the next frame estimated. In verifying whether or not the lateral boundary line candidate and the paint-blank boundary line candidate detected represent a lateral boundary line and a paint-blank boundary line of the lane mark, respectively, the estimation information memorized at a time point of the verifying is used for executing the verification.

The program for processing a picture image according to the present invention preferably further allows, in verifying whether or not lateral boundary line candidate and a paint-blank boundary line candidate are a lateral boundary line and a paint-blank boundary line of the lane mark, respectively, a computer to execute processing of detecting a set of the lateral boundary line candidate from the picture image information, and processing of detecting the paint-blank region boundary candidates from the picture image information in a region of the set of the lateral boundary line candidates detected.

The program for processing a picture image according to the present invention preferably further allows, in detecting the set of the lateral boundary line candidates, a computer to execute the processings of calculating a gradient of a luminance value in the picture image information with the use of an edge filter. The program preferably further allows a computer to execute processing of comparing an absolute value of the gradient to a preset threshold value to extract, as edge points, a plurality of points in each of which the absolute values of the gradient are not less than the preset threshold value. The program preferably further allows a computer to execute the processing of extracting, by Hough transform, a plurality of approximate straight lines passing through the edge points as contacting points, and performing preset evaluation processing on the approximate straight lines extracted to detect two of the approximate straight lines as the set of the lateral boundary line candidates. The program further includes, in detecting the paint-blank region boundary candidate, allowing a computer to execute the processing of: calculating a gradient of a luminance value in the picture image information with the use of an edge filter, and processing of comparing an absolute value of the gradient to another preset threshold value to extract, as edge points, a plurality of points in each of which the absolute value(s) of the gradient is not less than the another preset threshold value. The program further allows a computer to execute the processing of extracting, from a proximal side, two of the approximate straight lines passing through the edge points as contacting points by Hough transform, and detecting the two approximate straight lines extracted as the paint-blank boundary line candidates.

The program for processing a picture image according to the present invention preferably further allows, in verifying whether or not a lateral boundary line candidate and a paint-blank boundary line candidate are a lateral boundary line and a paint-blank boundary line of the lane mark, respectively, a computer to execute the processings of: comparing estimated positions of the lateral boundary line or the paint-blank boundary line in the estimation information memorized at a time point of verification with candidate positions of the lateral boundary line candidate and the paint-blank boundary line candidate to decide an evaluation value. The program preferably further includes a computer to perform processing of deciding whether or not the evaluation value(s) is not less than a further threshold value and verifying the lateral boundary line candidate and the paint-blank boundary line candidate to be a lane mark in case the evaluation value(s) is not less than the further threshold value.

The program for processing a picture image according to the present invention preferably further allows, in verifying whether or not a lateral boundary line candidate and a paint-blank boundary line candidate are a lateral boundary line and a paint-blank boundary line of a lane mark, respectively, a computer to execute the processing of verifying the lateral boundary line candidate and the paint-blank boundary line candidate to be not a lane mark when the evaluation value(s) is less than the further threshold values.

The program for processing a picture image according to the present invention preferably further allows, in verifying whether or not a lateral boundary line candidate and a paint-blank boundary line candidate are a lateral boundary line and a paint-blank boundary line of a lane mark, respectively, a computer to execute the processing of performing verification by decreasing the threshold value in case the verification results in keeping on to be not a lane mark despite a preset time has elapsed or the car has run a preset distance.

In the program for processing a picture image according to the present invention, the evaluation value is preferably decided by normal distribution having the estimated position as μ. The program further allows, in verifying whether or not a lateral boundary line candidate and a paint-blank boundary line candidate are a lateral boundary line and a paint-blank boundary line of a lane mark, respectively, a computer to execute processing of: performing verification by increasing a variance of the normal distribution in case the verification results in keeping on to be not a lane mark despite a preset time has elapsed or the car has run a preset distance.

The program for processing a picture image according to the present invention preferably further allows, in verifying whether or not a lateral boundary line candidate and a paint-blank boundary line candidate are a lateral boundary line and a paint-blank boundary line of a lane mark, respectively, a computer to execute processing of performing verification using the advance information including a line width of a lane mark, a length of a painted region and a length of a blank region in case no estimated information has been memorized at a time point of the verification.

According to the present invention, it is possible in lane mark recognition to reduce the chance of mistaken recognition to realize stable recognition performance. In particular, in recognition of a lane mark having a periodic pattern of painted and blank regions, the chance of mistaken recognition may be reduced. It is because the lateral boundary lines and the paint-blank boundary lines (the locations of the paint and blank regions) in a lane mark are estimated to verify the candidates of the lateral boundary lines and those of the paint-blank boundary lines. By so doing, in case a painted region is felt to have been detected at a location estimated to be a blank region, the outstanding false lane mark candidate may be decided to be not a lane mark. Viz., in a scene where a blank region of a broken line is represented in a target picture image, whilst a painted region is scarcely represented therein, it is possible to exclude the chance that a lane mark candidate, detected as a consequence of interference by another car running side-by-side, be mistakenly recognized as a lane mark.

BRIEF DESCRIPTION OF THE DRAWINGS

FIGS. 3A and 3B are schematic views for illustrating lane marks as the subjects of recognition by the picture image processing apparatus according to Example 1 of the present invention, with FIG. 3A being an overall view and FIG. 3B being an enlarged view of a broken-line lane mark.

FIGS. 5A, 5B and 5C are schematic views for illustrating, step-by-step, the operation of the candidate detection function in the picture image processing apparatus according to Example 1 of the present invention, with FIG. 5A showing the picture image information, FIG. 5B showing an imagery of extraction of edge points in the transverse direction and FIG. 5C showing an imagery of extraction of approximate straight lines as the lateral boundary line candidates.

FIGS. 6A, 6B and 6C similarly are schematic views for illustrating, step-by-step, the operation of the candidate detection function in the picture image processing apparatus according to Example 1 of the present invention, with FIG. 6A showing an imagery of detection of lateral boundary line candidates, FIG. 6B showing an imagery of extraction of edge points in the longitudinal direction and FIG. 6C showing an imagery of detection of paint-blank boundary lines.

MODES FOR CARRYING OUT THE INVENTION

Figure 1:
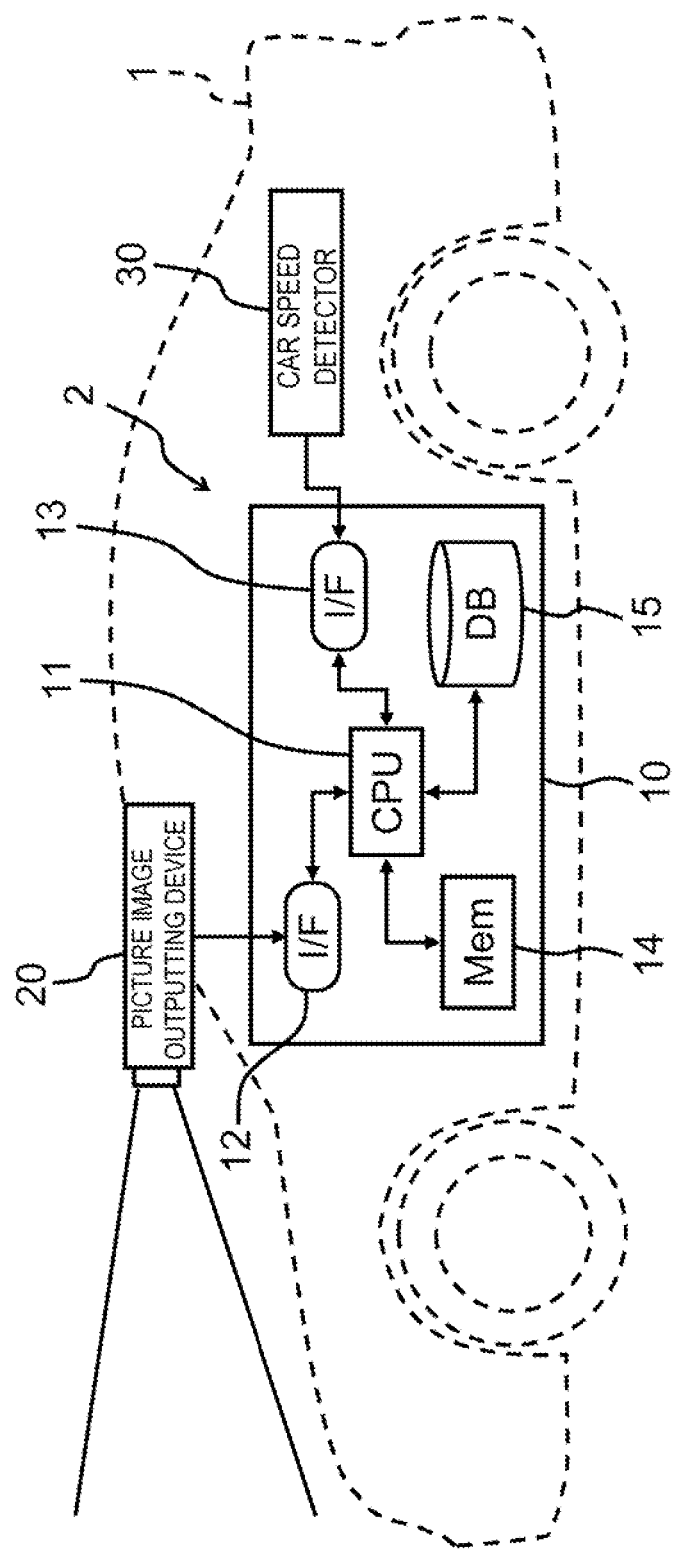
FIG. 1 is a block diagram schematically showing the configuration of a car including the picture image processing apparatus according to Example 1 of the present invention, with the car being shown with a phantom line.

A picture image processing apparatus according to an exemplary embodiment 1 of the present invention includes a candidate detection unit (150 of FIG. 2) detecting a lateral boundary line candidate and a paint-blank boundary line candidate of a lane mark from picture image information acquired. The picture image processing apparatus also includes a verification unit (160 of FIG. 2) verifying whether the lateral boundary line candidate and the paint-blank boundary line candidate, detected by the candidate detection unit, represent a lateral boundary line and a paint-blank boundary line of the lane mark, respectively. The picture image processing apparatus also includes a storage unit (130 of FIG. 2) memorizing the verification information as hysteresis information. The verification information includes the lateral boundary line candidate and the paint-blank boundary line candidate given that the lateral boundary line candidate and the paint-blank boundary line candidate have been verified by the verification unit to be the lateral boundary line and the paint-blank boundary line of the lane mark, respectively. The storage unit also memorizes the car speed information correlated with the hysteresis information. The picture image processing apparatus further includes an estimation unit (140 of FIG. 2) estimating, using the hysteresis information and the car speed information, the positions of the lateral boundary line and the paint-blank boundary line in the next frame corresponding to the picture image information which would be acquired next to the current picture image information. The storage unit memorizes the estimation information including positions of the lateral boundary line and the paint-blank boundary line estimated by the estimation unit. The verification unit performs the verification using the estimation information memorized in the storage unit at a time point of the verification.

Figure 2:
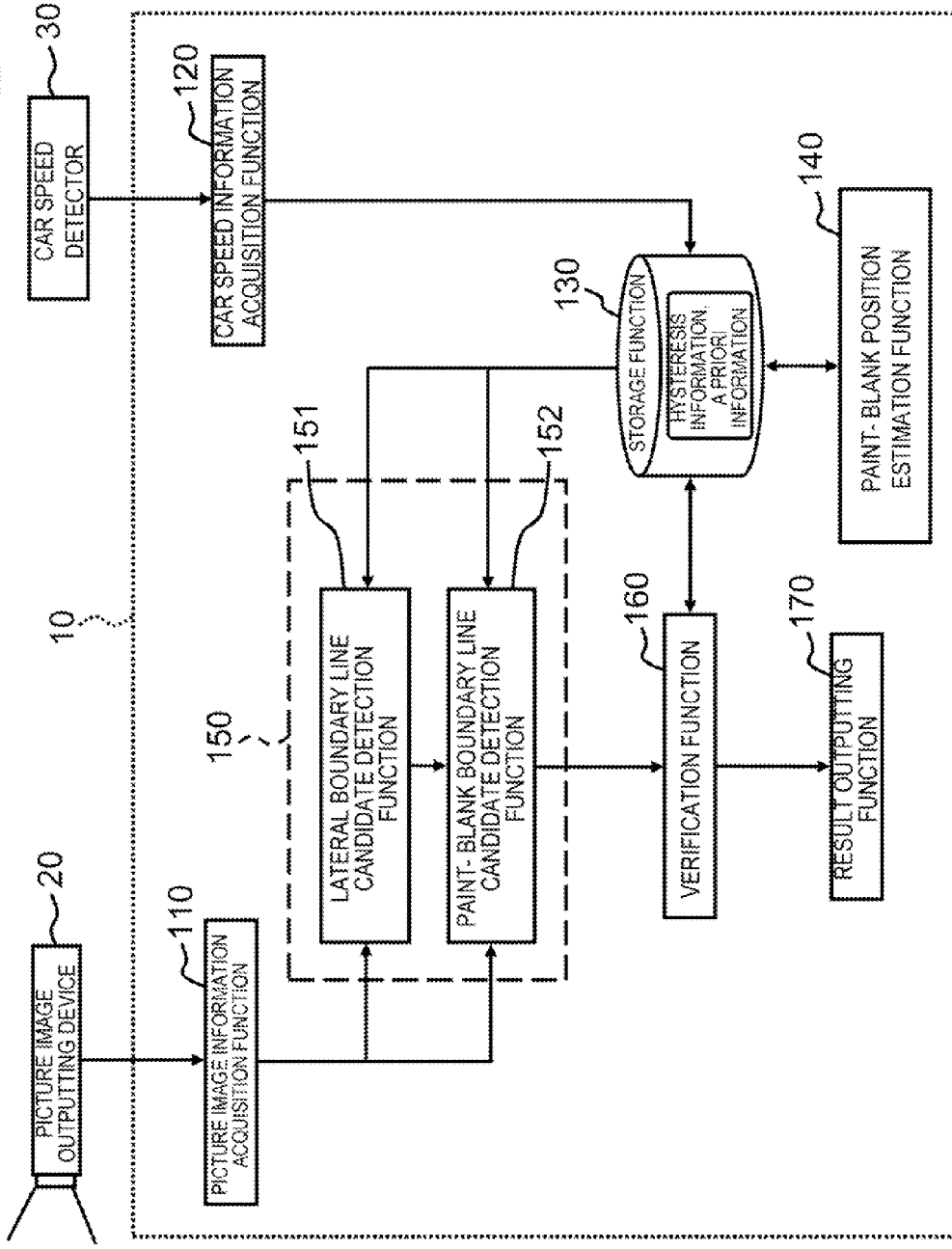
FIG. 2 is a block diagram schematically showing the configuration of the picture image processing apparatus according to Example 1 of the present invention.

A method for processing a picture image according to an exemplary embodiment 2 of the present invention includes detecting a lateral boundary line candidate and a paint-blank boundary line candidate of a lane mark from picture image information acquired (steps A2, A3 of FIG. 2). The method also includes verifying whether the lateral boundary line candidate and the paint-blank boundary line candidate detected represent a lateral boundary line and a paint-blank boundary line of the lane mark, respectively (step A4 of FIG. 10). The method also includes memorizing the verification information as hysteresis information. The verification information includes the lateral boundary line candidate and the paint-blank boundary line candidate given that the lateral boundary line candidate and the paint-blank boundary line candidate have been verified to be the lateral boundary line and the paint-blank boundary line of the lane mark, respectively. The car speed information correlated with the hysteresis information is also memorized (step A5 of FIG. 10). The method also includes estimating, using the hysteresis information and the car speed information, the positions of the lateral boundary line and the paint-blank boundary line in the next frame corresponding to the picture image information which would be acquired next to the current picture image information (step A7 of FIG. 10). The method also includes memorizing the estimation information including positions in the next frame of the lateral boundary line and the paint-blank boundary line estimated (step A7 of FIG. 10). The method further includes taking charge of the verification using the estimation information memorized at a time point of the verification in verifying whether the lateral boundary line candidate and the point-blank boundary line candidate represent the lateral boundary line and the point-blank boundary line of the lane mark, respectively.

Figure 10:
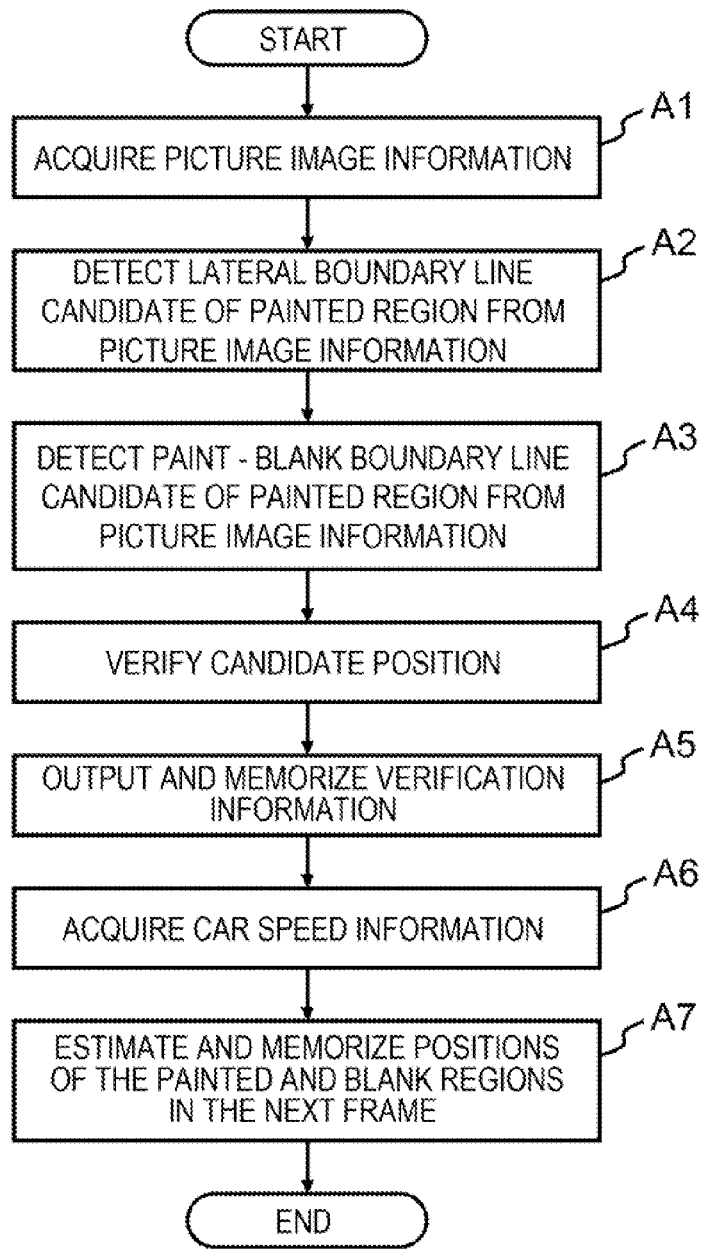
FIG. 10 is a flowchart schematically showing the operation of an electronic controller in the picture image processing apparatus according to Example 1 of the present invention.

A program for processing a picture image according to an exemplary embodiment 3 of the present invention allows a computer to execute the processing of detecting a lateral boundary line candidate and a paint-blank boundary line candidate of a lane mark from picture image information acquired (steps A2, A3 of FIG. 10). The program also includes verifying whether the lateral boundary line candidate and the paint-blank boundary line candidate detected represent a lateral boundary line and a paint-blank boundary line of the lane mark, respectively (step A4 of FIG. 10). The program also includes memorizing verification information, as hysteresis information. The verification information includes the lateral boundary line candidate and the paint-blank boundary line candidate at a time at which the lateral boundary line candidate and the paint-blank boundary line candidate have been verified to be the lateral boundary line and the paint-blank boundary line of the lane mark, respectively. The program also includes memorizing car speed information correlated with the hysteresis information (step A5 of FIG. 10). The program also includes estimating, using the hysteresis information and the car speed information, the positions of the lateral boundary line and the paint-blank boundary line in the next frame corresponding to the picture image information which would be acquired next to the current picture image information (step A7 of FIG. 10). The program also includes memorizing the estimation information including positions of the lateral boundary line and the paint-blank boundary line of the next frame estimated (step A7 of FIG. 10). In verifying whether the lateral boundary line candidate and the paint-blank boundary line candidate detected represent a lateral boundary line and a paint-blank boundary line of the lane mark, respectively, the estimation information memorized at a time point of the verification is used for the verification.

Example 1

Figure 4A:
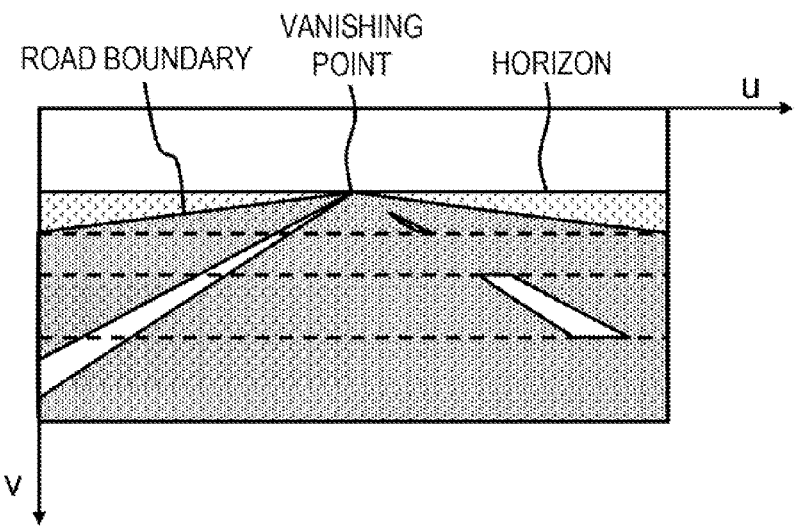
FIGS. 4A and 4B are schematic views for illustrating coordinate systems of the picture image information as the subject of picture image processing by the picture image processing apparatus according to Example 1 of the present invention, with FIG. 4A illustrating a camera picture image coordinate system and FIG. 4B illustrating a overview (bird's-eye views top plan view) picture image coordinate system.
Figure 4B:
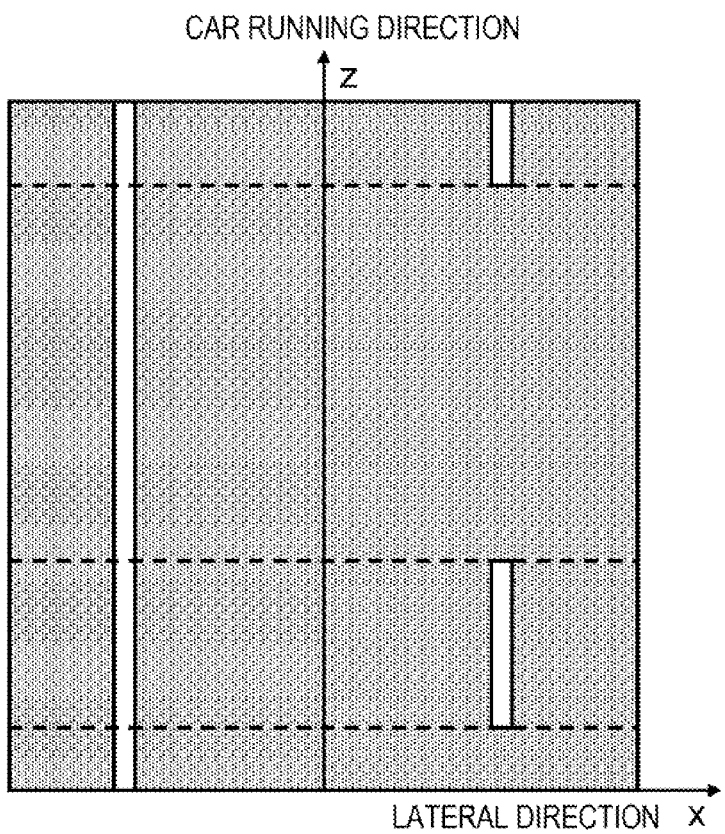
Figure 7:
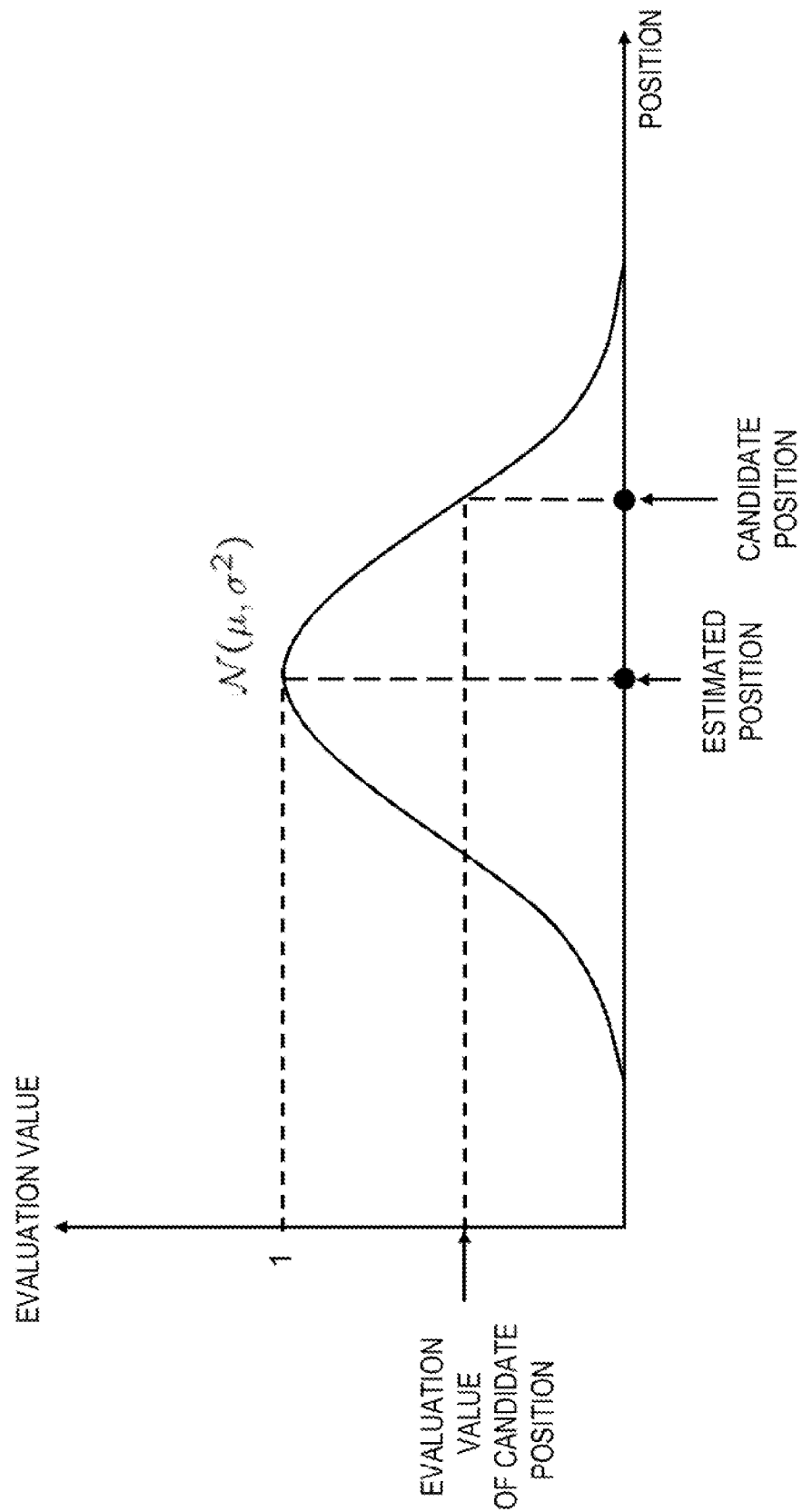
FIG. 7 is a schematic view for illustrating the operation of the verification function in the picture image processing apparatus according to Example 1 of the present invention.
Figure 8:
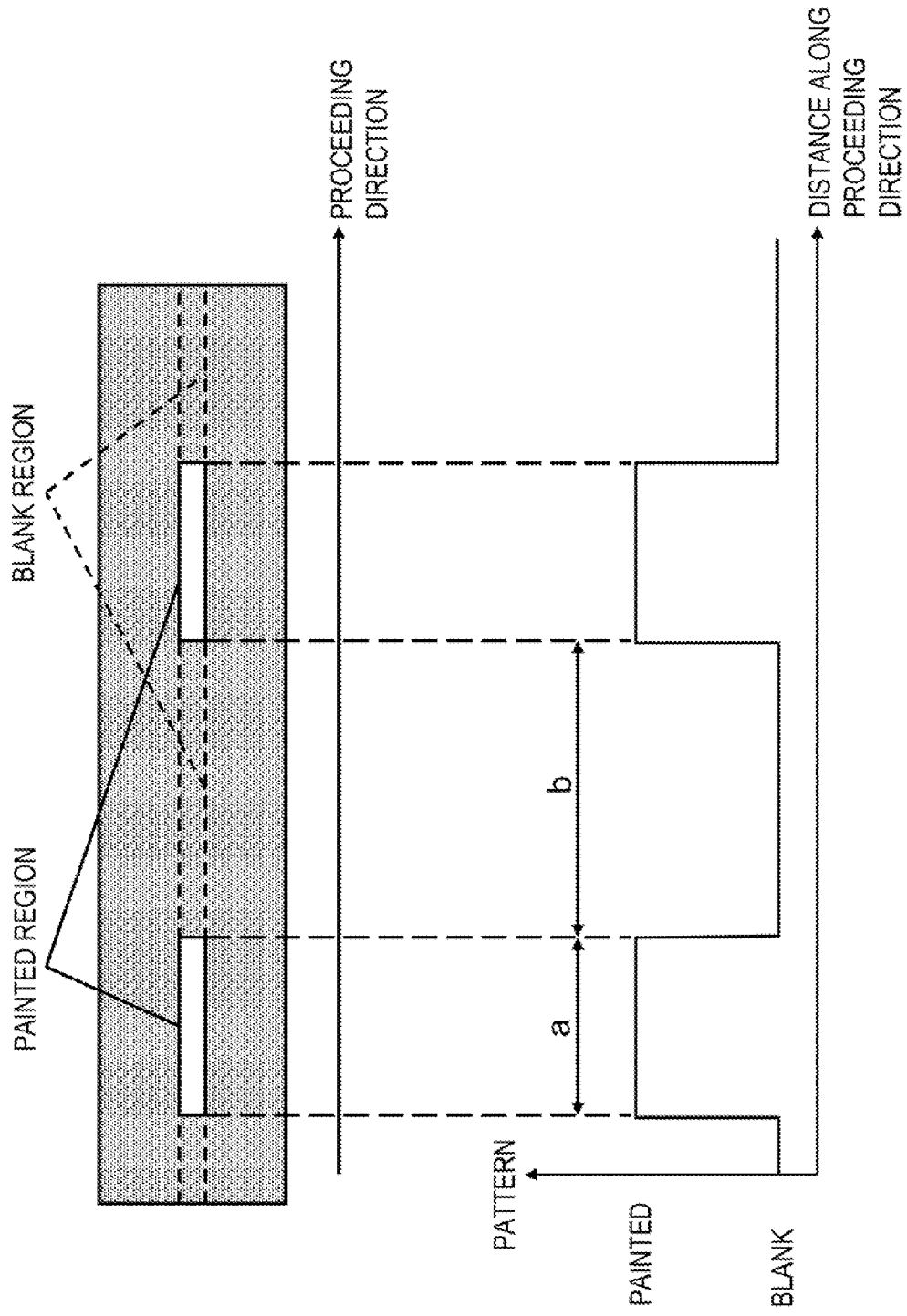
FIG. 8 is a schematic view for illustrating the periodic pattern of a broken-line lane mark as estimated by the paint-blank position estimation function in the picture image processing apparatus according to Example 1 of the present invention.
Figure 9:
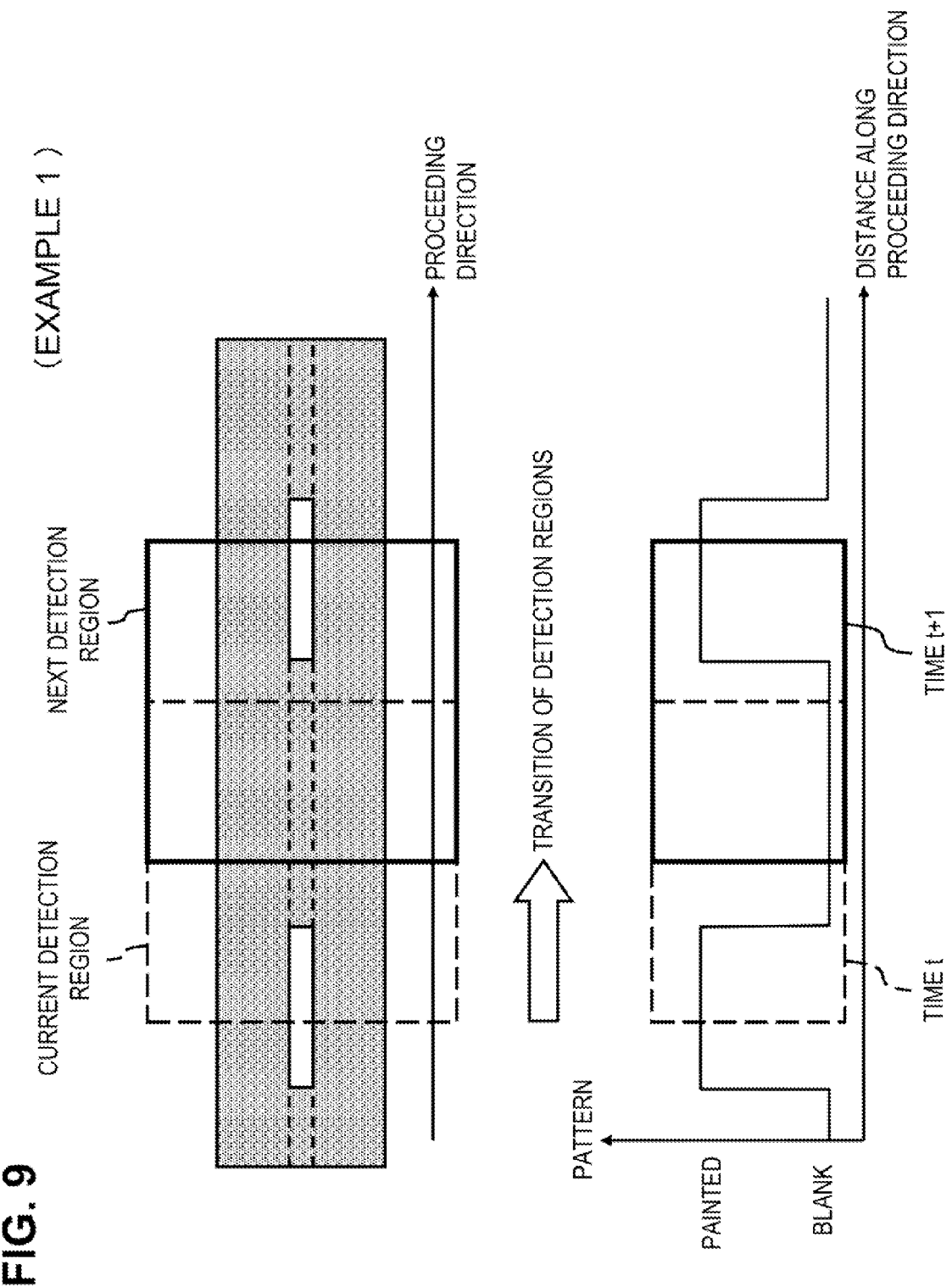
FIG. 9 is a schematic view for illustrating the transition of the paint-blank boundary line position as estimated by the paint-blank position estimation function in the picture image processing apparatus according to Example 1 of the present invention.

A picture image processor according to Example 1 of the present invention will now be described with reference to the drawings. FIG. 1 depicts a block diagram schematically showing a configuration of a car or a vehicle carrying a picture image processor according to Example 1 of the present invention, and FIG. 2 is a block diagram schematically showing a configuration of a picture image processor according to Example 1 of the present invention. FIGS. 3A and 3B are schematic views for illustrating lane marks as subjects of recognition in the picture image processor according to Example 1 of the present invention and, more specifically, are an overall plan view and an enlarged plan view of a broken-line lane mark, respectively. FIGS. 4A and 4B illustrate coordinate systems of the picture image information as the subject of picture image processing according to Example 1 of the present invention. More specifically, FIG. 4A is a perspective view showing a coordinate system of a picture image as captured by a camera and FIG. 4B is a top plan view showing an overview of the coordinate system for a picture image. FIGS. 5A, 5B and 5C are schematic views showing, step-by-step, the operation of a candidate detection unit in the picture image processor according to Example 1 of the present invention and specifically illustrate the picture image information, an imagery of edge point extraction in the lateral direction and an imagery of extraction of approximate straight lines as lateral boundary line candidates, respectively. FIGS. 6A, 6B and 6C are schematic views showing, step-by-step, the operation of a candidate detection unit in the picture image processor according to Example 1 of the present invention, and specifically illustrate an imagery of extraction of lateral boundary line candidates, an imagery of edge point extraction in the vertical direction and an imagery of detection of a paint-blank boundary line, respectively. FIG. 7 is a graph illustrating the operation of a detection unit in the picture image processor according to Example 1 of the present invention. FIG. 8 is a schematic view for illustrating a periodic pattern of the broken-line lane mark as estimated by a paint-blank position estimation mechanism in the picture image processor according to Example 1 of the present invention. FIG. 9 is a schematic view for illustrating the transition of a paint-blank transition line as estimated by the paint-blank position estimation function in the picture image processor according to Example 1 of the present invention.

Referring to FIG. 1, a picture image data processor 2 is an apparatus for recognizing a lane mark in a picture image (lane mark recognition device). The picture image processor 2 is laden on a car 1, in FIG. 1, and includes a picture image outputting device (unit) 20, a car speed detector 30 and an electronic controller 10. Although the car 1 is envisioned in FIG. 1 to be an automobile, it may also be a transport vehicle, adapted for running autonomously within the premises of a factory, or a mobile robot.

The lane mark, as the subject of recognition, denotes a mark indicating the boundary of a lane (car lane or runway) painted (or otherwise installed such as by plotting) on a road surface, as shown in FIG. 3. The lane mark may be formed by a solid-line mark, painted in white or yellow, a broken-line mark, or a three-dimensional reflection element, either alone or in combination. The broken-line lane mark may be of a pattern composed of alternately regularly (that is, periodically) arranged painted regions 210 and blank regions 220, while the three-dimensional reflection elements may be arranged in a regular pattern (called cat's eyes or Botts'-dots). In Example 1, the lane marks to be recognized are broken-line marks composed of a regular pattern of the painted regions 210 and the blank regions 220, as shown in FIG. 3. However, a solid-line mark may also be included in a pattern of the broken-line mark. There are also cases where the three-dimensional reflection elements, such as cat's eyes or Botts' dots, may be handled similarly to the solid line or broken line lane marks provided, that a region with dense three-dimensional reflection elements is regarded to be a painted region and a region with sparse three-dimensional reflection elements is regarded to be a blank region. In the following, a generalized broken line lane mark, including the above mentioned solid-line lane mark or the three-dimensional reflection element, is described as the subject for recognition in Example 1 of the present invention. It is observed that, according to the present invention, not only the lane marks, painted on the road surface for cars or vehicles, but also the entirety of other suitable marks, such as solid-line or broken-line marks, are to be used as the subjects for recognition.

FIGS. 3A and 3B illustrate the names of the various portions of the lane marks. Each region where the mark is painted or installed is termed a painted region 210. A plurality of blank regions, located between the painted regions, is termed blank regions 220. These blank regions occur periodically in alternation with the painted regions along the car running direction. The length of each painted region 210 and that of each blank region 220 along the car running direction are respectively labeled a length of the painted region 250 and a length of a blank region 260. The boundary of the painted region 210 parallel to the lane is labeled a lateral boundary 230 (lateral boundary line). The boundary between the painted region 210 and the blank region 220 is labeled a paint-blank boundary 240 (paint-blank boundary line).

A picture image outputting device 20 is a device that outputs at least the picture image information to the electronic controller 10. In FIG. 1, an imaging device (image pickup device) is used as the picture image outputting device 20. The imaging device, a device that captures a picture image in real-time, is loaded in the car 1 such as to photograph an image of the status ahead of the car 1. For example, a video camera of the NTSC (National Television Standards Committee) output may be used as the imaging device. A picture image capturing device that reads out the picture image information stored in a recording medium to convert the so readout information into an NTSC output may also be used as the picture image outputting device 20 in place of an imaging device.

The car speed detector 30 is a device that detects the running speed (car speed) of the car 1. The car speed detector 30 outputs the as-detected car speed information to the electronic controller 10. A speedometer loaded in the car 1 is used in FIG. 1 as the car speed detector 30. In place of the speedometer, the car speed detector 30 may be a device that detects the car speed based upon the sensor information from a sensor separately loaded on the car 1 for sensing the speed of the rotation, angle of the wheel axle. The car speed detector may also be a device that detects the car speed based upon the sensor information from a sound wave sensor loaded on the car 1, or a device that detects the car speed based upon the picture image information from an image pickup device loaded on the car 1.

The electronic controller 10 is a computer that performs information processing to recognize a lane mark. The electronic controller 10 performs information processing to recognize a lane mark, in response to the picture image information from the picture image outputting unit 20 and to the car speed information from the car speed detector 30, based upon a preset program (including a database, for example). The electronic controller 10 includes a central processing unit 11, interfaces 12, 13, a memory (Mem) 14 and a storage unit (DB) 15. Although FIG. 1 shows the memory (Mem) 14 and the storage unit (DB) 15 in separation from each other, these may also be combined in a single storage device.

The interface 12 is a device that mediates information exchange between the central processing unit 11 and the picture image outputting unit 20. The interface 13 is a device that mediates information exchange between the central processing unit 11 and the car speed detector 30. The memory 14 is a device that stores temporary data and is electrically connected to the central processing unit 11. The storage unit (DB) 15 is a device that mainly stores a database (DB) and is electrically connected to the central processing unit 11. Although FIG. 1 shows the memory 14 and the storage unit 15 as being enclosed in the electronic controller 10, they may also be arranged as external storage devices. The central processing unit 11 takes charge of information processing and is electrically connected to the interfaces 12, 13 and to the storage unit 15. By running a program, the central processing unit 11 carries out information processing in order to recognize a lane mark, as it refers from time to time to the information stored in the memory 14 and the storage unit 15, based upon the picture image information and the car speed information as delivered from the picture image outputting device 20 and the car speed detector 30 via the interfaces 12, 13.

By running a software program in the central processing unit 11, the electronic controller 10 implements a picture image information acquisition function 110, a car speed information acquisition function 120, a storage function 130, a paint-blank position estimation function 140, a candidate detection function 150, a verification function 160, and a result outputting function 170, as shown in FIG. 2. It is observed that the functions 110-170 implemented in the electronic controller 10 may also be implemented as individual devices, functional units or electronic circuits.

The picture image information acquisition function 110 is a function of acquiring the picture image information output from the picture image outputting unit 20. The picture image information acquisition function 110 transfers the picture image information, thus acquired, to a lateral boundary line candidate detection function 151 and a paint-blank boundary line candidate detection function 152 in the candidate detection function 150.

The car speed information acquisition function 120 is a function of acquiring the car speed information output from the car speed detector 30. The car speed information acquisition function 120 transfers the car speed information acquired to the storage function 130.

The storage function 130 is a function of memorizing the information needed by the electronic controller 10 in recognizing a lane mark. The storage function 130 memorizes, as the principal information, advance information, hysteresis information, car speed information and estimation information. The storage function 130 delivers the advance information, car speed information and the past hysteresis information to the paint-blank position estimation function 140. The storage function 130 delivers the advance information to the candidate detection function 150.

It is observed that the advance (or initial) information is the information necessary for recognizing the lane mark in advance, such as lane mark line width, runway width, or the initial value of the blank length of a broken line. The hysteresis information is the information including the information of past verification (recognition result information) regarding the lane mark position as verified (recognized) by the verification function 160. The car speed information is the information regarding the running speed of the car 1. The estimation information is the information including the location of the paint region and the blank region in the next frame as estimated by the paint-blank position estimation function 140. This next frame is a picture image corresponding to the picture image information to be acquired next to the current picture image information.

The candidate detection function 150 is a function of detecting the positions of the painted region and the blank region of a candidate lane mark (lane mark candidate) by picture image processing of the picture image information obtained by the picture image information acquisition function 110. The candidate detection function 150 outputs to the verification function 160 the detection information including the positions of the painted and blank regions detected. The candidate detection function 150 includes the lateral boundary line candidate detection function 151 and the paint-blank boundary line candidate detection function 152.

The coordinate system of the picture image information, processed by the candidate detection function 150, may be a camera picture image coordinate system or an overview picture image coordinate system. The camera picture image coordinate system (see FIG. 4A) is a coordinate system as defined in an input camera picture image, and the overview picture image coordinate system (see FIG. 4B) is an overview (top plan) picture image coordinate system as defined in the overview or downward picture image transformed from the camera picture image. The camera picture image coordinate system may be interchanged with the overview picture image coordinate system and vice versa provided that the outer parameters of the camera (positions and orientations of the camera with respect to the road surface) as well as its internal parameters (focal length, pixel size etc.) are known from the outset. Referring to FIG. 4A, in the camera picture image coordinate system, an upper left end of the camera picture image is set as a point of origin, and a coordinate proceeding rightwards from the point of origin is defined as u axis, whilst a coordinate axis proceeding downwards therefrom is defined as v axis. Referring to FIG. 4B, the overview picture image coordinate system is defined on a plane of a road on which runs a car or a vehicle. For example, a point of projection of a camera on the road surface is set as a point of origin, and a coordinate axis along the car running direction is defined as a Z axis. A coordinate axis along a lateral direction, viz., a coordinate normal to the car running direction, is defined as an X axis. It is observed that, although there are lane marks on both left and right sides of the car, the following description is concerned with recognition of a one-side lane mark only, unless otherwise specified. Viz., it is understood that the operation for the one side lane mark is to be independently carried out for the other side lane mark, unless otherwise specified.

The lateral boundary line candidate detection function 151 detects, in the picture image information acquired from the picture image information acquisition function 110, pair lateral boundary line candidates (230 of FIG. 3), viz., lateral boundary line candidates. These lateral boundary line candidates are on left and right ends of the painted region (210 of FIG. 3) of the lane mark in the above mentioned picture image information. Specifically, the lateral boundary line candidate detection function 151 calculates the gradient of luminance values in the picture image in the picture image information, using an edge filter, such as a Sobel filter. A gradient value (absolute value) calculated is compared to a threshold value to extract a point of an acute gradient value (absolute value) as an edge point. A candidate straight line passing through a plurality of these edge points (approximate straight line) is extracted. A plurality of such approximate straight lines is so extracted. A set of two of such approximate straight lines extracted is selected as being lateral boundary line candidates on either sides of the lane mark. The position information of the lateral boundary line candidates is output to the paint-blank boundary line candidate detection function 152. It is observed that the Sobel filter is such a filter that, based upon the result of calculations of the spatial first derivative, detects the contour of a location experiencing the variations in the luminance value in the picture image.

It is observed that the lateral boundary line of the lane mark is regarded to be a straight line in a near-distance picture image (picture image proximate to the camera). Therefore, such a method may be used in which, as is done in Patent Document 1, Hough transform is applied for extracted edge points to find an approximate straight line. It is observed that Hough transform is a technique of extracting a straight line or a circle from a picture image. In general, the edge points extracted are corrupted with noise. Thus, it may sometimes occur that a plurality of approximate straight lines is extracted based on the edge points, as a result of which a larger number of end lateral boundary line candidates than are actually present in the picture image may be extracted from time to time.

In deciding the set of the approximate straight lines, as lateral boundary line candidates, a plurality of approximate straight lines as end lateral boundary line candidates are evaluated as to parallelism, whether or not the spacing is proper as a line width of a lane mark or as to whether or not there is a painted region on an inner side, by way of screening of the candidates. In the camera picture image coordinate system, shown for example in FIG. 4A, parallelism may be evaluated based on the fact that a point of intersection of two straight lines is observed in the vicinity of a horizon. In similar manner, the spacing may be evaluated based upon an angle defined between the two straight lines, whilst the presence or absence of the painted region may be evaluated by checking an average value of luminance of each row (v coordinate) of a region delimited by the two straight lines. An evaluation equivalent to that described above may also be made for the overview coordinate system transformed from the camera picture image coordinate system (see FIG. 4B).

The operation of deciding on the candidates of the lateral boundary lines by screening may be carried out by the lateral boundary line candidate detection function 151 or by the verification function 160. To relieve the load of calculations in the subsequent processing, there may be cases where it is more desirable to reduce the number of the candidates of the lateral boundary lines by the lateral boundary line candidate detection function 151 at the outset.

The paint-blank boundary line candidate detection function 152 is a function of detecting a candidate of the paint-blank boundary line (240 of FIG. 3) of the painted region (210 of FIG. 3) (paint-blank boundary line candidate). This paint-blank boundary line candidate is detected in a region of the lateral boundary line candidates on left and right side ends of the lane mark as detected by the lateral boundary line candidate detection function 151. The paint-blank boundary line candidate detection function 152 decides the painted region (210 of FIG. 3) and the blank region (220 of FIG. 3) in the lane mark candidate, based upon the paint-blank boundary line candidate detected and upon the lateral boundary line candidate as detected by the lateral boundary line candidate detection function 151. The paint-blank boundary line candidate detection function 152 then transmits the detection information, including the position information of the painted region and the blank region in the lane mark candidate, thus decided, to the verification function 160.

In detecting the paint-blank boundary line candidate, the paint-blank boundary line candidate detection function 152 may operate similarly to the lateral boundary line candidate detection function 151. Specifically, the paint-blank boundary line candidate detection function 152 calculates the gradient of luminance values in a picture image of the picture image information within the region of the lateral boundary line candidate, using an edge filter, such as a Sobel filter. A gradient value (absolute value) calculated is compared to a threshold value to extract, as an edge point, a point having a gradient value (absolute value) greater than a preset value. A candidate straight line passing through a plurality of these edge points (approximate straight line) is extracted by Hough transform. The approximate straight line extracted may be taken to be a paint-blank boundary line.

It is observed that, in extracting an edge point, the paint-blank boundary line candidate may be regarded to be normal to the orientation of the lateral boundary line candidate. Hence, filtering may be applied to a region surrounded by a set of lateral boundary line candidates, using an edge filter, such as Sobel filter, such as to extract an edge point in the vertical direction (longitudinal direction or the car running direction).

On the other hand, upper/lower ends of paint-blank boundary line candidates may be distinguished from each other. For example, if respective edge points may be distinguished from one another based upon the sign of the gradient of the luminance values, a positive edge point would be extracted at the lower boundary of the painted region, whilst a negative edge point would be extracted at its upper boundary. Hence, an approximate straight line of positive edge points is extracted as a lower end boundary of a paint-blank boundary line candidate, whilst an approximate straight line of negative edge points is extracted as an upper end boundary of a paint-blank boundary line candidate. A plurality of paint-blank boundary line candidates, inclusive of those which are positive and negative in sign, may be detected for a lane mark candidate composed of a set of lateral boundary line candidates. Initially, an edge line of the paint-blank boundary line candidate at the most proximal side is selected, with the intensity of the gradient as a reference. Next, an edge line, opposite in sign to the most proximate side edge line, and which is spaced apart from the most proximal side edge line by a preset distance, is selected. It is observed that the range of a distance allowed as the length of the painted region and that of the blank region is to be set based upon the advance information. Extraction of the paint-blank boundary line candidates may be finished at a time point each one of boundary lines that are positive and negative in sign has been extracted, beginning from the proximal side.

It is understood that the position information of the lateral boundary line candidate and the position information of the paint-blank region boundary line candidate, found as described above, are to be included in the detection information that may be obtained by the candidate detection function 150.

The operation of the candidate detection function 150 will now be specifically explained. Initially, edges of the picture image information obtained from the picture image information acquisition function 110 (see FIG. 5A) are detected (see FIG. 5B) in a transverse direction (leftwards). A plurality of approximate straight lines, which will provide lateral boundary line candidates, is then extracted by Hough transform (see FIG. 5C). A pair of approximate straight lines is obtained by screening in accordance with a criterion as set out above such as to detect left and right end lateral boundary line candidates (see FIG. 6A). Then, from the picture image information of a region surrounded by the pair lateral boundary line candidates (see FIG. 6A), an edge is extracted in the vertical direction (upwards) (see FIG. 6B). Two approximate straight lines (one positive line and one negative line), which are to become paint-blank boundary line candidates (PB boundary line candidates) are detected from the proximal side (see FIG. 6C). The positions of the painted region and the blank region in the lane mark candidate are decided based upon the lateral boundary line candidates and paint-blank boundary line candidates detected.

The verification function 160 is a function that verifies whether or not the lane mark candidates, detected by the candidate detection function 150, is a lane mark. The verification function 160 decides an evaluation value of each of the positions (candidate positions) of the lane mark candidates (painted and blank regions) as detected by the candidate detection function 150. The evaluation value is an evaluation of the lane mark-likeness of the lane mark candidate in question and is referred to below as 'lane mark evaluation value'. In deciding the evaluation value, an estimated position of the lane mark (painted and blank regions) in the estimation information obtained by estimation at the paint-blank position estimation function 140 as later explained is exploited. The verification function also decides whether the lane mark evaluation value as decided is not less than a threshold value. If the lane mark evaluation value is not less than the threshold value, the verification function recognizes the lane mark candidate as being the lane mark and outputs to the result outputting function 170 the fact that there exists a lane mark and the verification information (information of the result of recognition) inclusive of the lane mark candidate position. The verification function 160 also sequentially transmits the verification information as hysteresis information to the storage function 130. It is observed that, in case the lane mark evaluation value is less than the threshold value, the lane mark candidate is not recognized by the verification function 160 to be a lane mark. In this case, the verification function 160 outputs the verification information, inclusive of the fact that there is no lane mark, to the result outputting function 170 and to the storage function 130.

The lane mark evaluation value is made up of (1) a reliability evaluation value of the position of the lateral boundary line candidate, referred to below as 'lateral position evaluation value', and (2) a reliability evaluation value of the position of the paint-blank boundary line candidate, referred to below as 'phase evaluation value'. (1) The lateral position evaluation value is decided by comparing an estimated position of the lateral boundary line in the estimation information obtained by estimation by the paint-blank position estimation function 140, as set out later, to the position of the lateral boundary line candidate (candidate position) in the detection information as obtained by detection by the candidate detection function 150. Given that the estimation information includes an estimated position of the lateral boundary line and an estimated speed in the lateral direction, a value at a candidate coordinate position in the normal distribution curve of FIG. 7, centered about the estimated position, may be an evaluation value. A normal distribution N is given by the following equation (mathematical expression 1):

$$\mathcal{N}(\mu, \sigma^2) = \frac{1}{\sqrt{2\pi}\,\sigma}\exp\left(-\frac{(x-\mu)^2}{2\sigma^2}\right)$$ [Mathematical Expression]

In the above equation, the center (estimated position) is μ and the variance is $\sigma^2$. The variance may be a function of a product of an estimated speed in the lateral direction (VL) and the time that elapses during one frame (TF), viz., an estimated distance of movement during one-frame period (XF=VL× TF). For example, $\sigma^2=(XF)^2$ is used. It is observed that there are a set of two lateral boundary lines and another set of two lateral boundary lines on left and right sides of a given lane mark. It is thus possible to find an evaluation value for each of the left and right sides and to calculate an average evaluation value which may be taken to be a lateral position evaluation value. It is however also possible to use only the evaluation value at the left or right side lateral boundary line position, whichever is the side closer to the car, viz., the evaluation value of the lateral boundary line position lying at a more inner side.

The phase evaluation value is decided as an estimated position of a paint-blank boundary line in the estimation information obtained by estimation at the paint-blank position estimation function 140 as later explained is compared to a position of a paint-blank boundary line candidate (candidate position) in the detection information obtained by detection at the candidate detection function 150. The evaluation value of the candidate position may be decided at this time by normal distribution centered about the estimated position, as shown in FIG. 7, as in the case of deciding the lateral position evaluation value set out above.

As the speed in the car running direction, the car speed information (VF), obtained from the car speed information acquisition function 120, may be used. The variance is set so that '$\sigma^2=(VF\times TF)^2$', for example. A plurality of paint-blank boundary line candidates, inclusive of those that are positive or negative in sign, may be detected for a single lane mark candidate. In such case, the evaluation values may be averaged to find an average value which may be used as a phase evaluation value. A weighted average value may also be found so that the candidates closer to the camera will be prioritized, and the so found weighted average value may be used as the phase evaluation value. However, if no blank region candidate has been detected in the detected lane mark candidate, for example, (1) in case a region in question is estimated to be a painted region in the range of a detection region of the next frame in the car proceeding direction, even with the estimation by the paint-blank position estimation function 140, the evaluation value may be set at 1. (2) For cases other than (1), the proximal side and the distal side of the detection region of the next frame are taken to be upper and lower end boundaries of the painted region, and an evaluation value with respect to the estimated position existing in the detection region of the next frame is calculated.

The frame herein means one of time-series picture images (moving pictures). The detection region herein means a specified region in a frame (picture image) and specifically means a specified region on the road surface in the frame upon recognizing a lane mark.

The lane mark evaluation value is decided as the lateral position evaluation value and the phase evaluation value are comprehensively taken into account. While there is a number of methods that may be used to decide the lane mark evaluation value, the product of the lateral position evaluation value and the phase evaluation value, for example, may be taken to be such lane mark evaluation value.

In deciding the lane mark evaluation value, the estimated position of the lane mark (painted region and the blank region) in the estimation information obtained by the paint-blank position estimation function 140 is exploited. However, there may be cases where there is no sufficient stock of the hysteresis information and hence the estimation information derived therefrom, such as at the system start time. In such cases, the lane mark position, decided based upon the advance (initial) information in advance, may be used until such time the hysteresis information necessary for estimation is stored after certain time lapse. Or, the paint-blank boundary line position may not be evaluated and just the lateral boundary line position may be estimated by way of simplifying the verification.

There are cases where the phase of the periodic paint-blank pattern is appreciably changed, such as when the series of lane marks are once interrupted and re-commenced, as in the case of passing through a road crossing. If, in such case, the evaluation by the above mentioned method is sustained, it may be an occurrence that a correct lane mark is concluded to be a non-lane mark. Such case may be coped with as follows: If the lane marks are not recognized continuously throughout a preset number of frames, the criterion of verification may be moderated. To do this, a greater value of the variance of the lateral position evaluation values or the phase evaluation values may be used, or the value of relative weights of the lateral position evaluation values and the phase evaluation values may be changed. Or, the threshold values used in the lane mark evaluation values may be lowered.

The result outputting function 170 is a function of outputting the verification information from the verification function 160 to outside the electronic controller 10.

The paint-blank position estimation function 140 is a function of estimating the positions of the painted region and the blank region of the next detection region (see FIG. 9) using the hysteresis information as stored in the storage function 130 and the car speed information. If there is no stock of the hysteresis information, the advance information may be used. The car speed information has been acquired from the car speed information acquisition function 120 via the storage function 130. The paint-blank position estimation function 140 outputs the estimation information, including the estimated positions of the painted region and the blank regions of the next detection region, to the storage function 130.

It is observed that the next detection region is a region for detection anticipated to be verified at a time point (t+1) after lapse of certain time as from the time t for the current detection region as verified by the verification function 160 (see FIG. 9).

An example estimation operation of the paint-blank position estimation function 140 is the following. It is observed that, in the explanation to follow, the position indication is in terms of overview picture image coordinate points.

The positions of the painted region and the blank region of the next detection region may be estimated by estimating (1) left-hand and right-hand side end lateral boundary line positions and (2) the paint-blank boundary line positions in the next detection region independently of each other. (1) In estimating the lateral boundary line positions, a probability transition model, such as a Kalman filter (see Non-Patent Document 1), is used to estimate the lateral boundary line position (and the speed along the lateral direction). (2) In estimating the paint-blank boundary line position, a probability transition model, such as Kalman filter, may be used to estimate the paint-blank boundary line transition, as in the case of estimating the lateral boundary line positions.

As another method for estimation, (1) initially the periodic lane mark pattern (viz., the length of the painted region and that of the blank region) is estimated. Next, (2) the phase transition of the above pattern is estimated. Finally, (3) the positions of the painted region and the blank region in the next detection region, corresponding to the next detection information, are found to allow comparison in the verification function 160 to the next detection information (the information that is detected by the candidate detection function 150 and that includes the positions of the painted region and the blank region). In estimating the periodic pattern of the lane mark in (1), the hysteresis information of a sizeable number of frames on a reference line of a preset length put on a z-coordinate axis of the overview coordinate system or on a v-coordinate axis of the camera picture image coordinate system is used. Specifically, the number of frames in each of which the painted regions or the blank regions were recognized on end, the length of time that has elapsed between the frames and the car speed information are used. It is thus possible (see FIG. 8) to estimate the periodic patterns of the lane marks that passed the reference line in the past (length a of the painted region and a length b of the blank region). (2) Phase transition estimation may readily be made, with the use of the car speed information, from the calculations of the distance (stroke) traversed as from a time point of acquisition of the current frame until acquisition of the next frame. (3) The position of the paint-blank boundary line in the next detection region may simply be found from a position of the paint-blank boundary line when the periodic pattern estimated for the next detection region is shifted from the current detection region by a value corresponding to phase change (see FIG. 9).

The estimated information, obtained by estimation at the paint-blank position estimation function 140, is stored in the storage function 130. The latest estimated information is used by the verification function 160 in verifying the lane mark candidate of the next frame. The estimated information may also be used to advantage in efficiently performing the detection processing at the time of detecting the candidate positions of the paint and blank regions of the lane mark candidates for the next frame in the candidate detection function 150. Specifically, an area in a picture image, centered about the positions of the lateral boundary lines and the paint-blank boundary lines in the as-estimated next frame, is specified to delimit the region where the processing of verification is to be carried out. It may be premeditated that doing so may reduce the load of calculations in the processing of detecting the lateral boundary line candidates and the paint-blank boundary line candidates by the candidate detection function 150.

The operation of the picture image processor according to Example 1 of the present invention will now be described with reference to the drawings. FIG. 10 depicts a flowchart schematically showing the operation of the electronic controller in the picture image processing device according to Example 1 of the present invention. It is observed that the flowchart shown in FIG. 10 corresponds to the processing sequence of a software program executed by the central processing unit 11 of the electronic controller 10 shown in FIG. 1.

Referring to FIG. 10, the electronic controller (10 of FIG. 2) acquires, by the picture image information acquisition function (110 of FIG. 2), the picture image information, as a subject for recognition, from the picture image outputting device (20 of FIG. 2) (step A-1).

The electronic controller 10 then detects, by the lateral boundary line candidate detection function (151 of FIG. 2), the positions of the lateral boundary line candidates on left and right side ends of the painted region from the picture image information from the picture image information acquisition function 110 (step A2).

The electronic controller 10 then detects, by the paint-blank boundary line candidate detection function (152 of FIG. 2), the position of the paint-blank boundary line candidates of the painted region from the picture image information of the picture image information acquisition function 110 (step A3).

The electronic controller 10 then compares, by the verification function (160 of FIG. 2), the latest estimation information memorized by the storage function 130 to the candidate positions of the lateral boundary lines and the paint-blank boundary lines, while performing the processing of comparison to a threshold value. It is observed that the candidate positions of the lateral boundary lines and the paint-blank boundary lines have been detected by the lateral boundary line candidate detection function 151 and the paint-blank boundary line candidate detection function 152, respectively. This allows verifying the lane mark candidate position (step A4). In verifying the lane mark candidate positions, the lane mark evaluation values of the lane mark candidates are decided by taking advantage of the estimated positions of the lane marks (lateral boundary lines and paint-blank boundary lines) in the estimation information. It is then concluded whether or not the lane mark evaluation value as decided is not less than the threshold value. In case the lane mark evaluation value is not less than the threshold value, the lane mark candidate is recognized to be a lane mark. In this case, the verification information including the purport that there is the lane mark and the position of the lane mark candidate is generated. If conversely the lane mark evaluation value is less than the threshold value, the lane mark candidate is not recognized as a lane mark. In this case, the lane mark candidate is not recognized to be a lane mark and the verification information including the purport that there is no lane mark is generated.

The electronic controller 10 outputs the verification information generated by the verification function 160 by the result outputting function (170 of FIG. 2) (step A5). In this case, the storage function 130 memorizes the verification information at the verification function 160 as the hysteresis information.

The electronic controller 10 then acquires the car speed information from the car speed detector (30 of FIG. 2) by the car speed information acquisition function (120 of FIG. 2) (step A6).

Finally, the electronic controller 10 estimates, by the paint-blank position estimation function (140 of FIG. 2), the positions of the painted region and the blank region, viz., the positions of the lateral boundary lines and the paint-blank boundary lines, in the next frame (step A7). The estimation information, including the estimated positions of the lateral boundary lines and the paint-blank boundary lines, is memorized by the storage function 130 for use in verifying the next lane mark candidate position.

In Example 1, the lane mark pattern, in particular the position information of the blank region, is used for decision in lane mark recognition. The risk of mistaken lane mark recognition may thus be reduced to improve the recognition performance.

Figure 11:
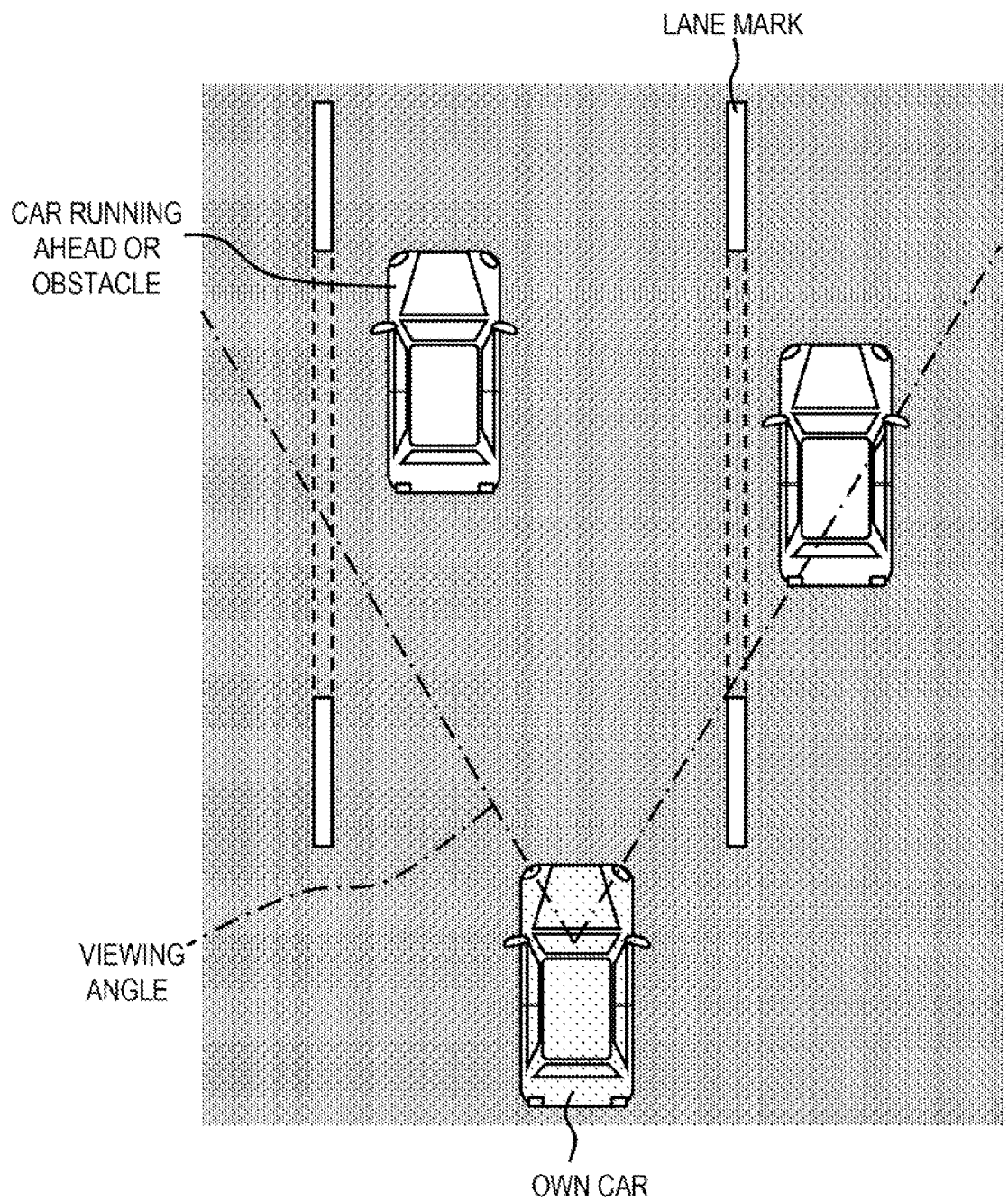
FIG. 11 is a plan view schematically showing a situation presupposed in the electronic controller in the picture image processing apparatus according to Example 1 of the present invention.
Figure 12:
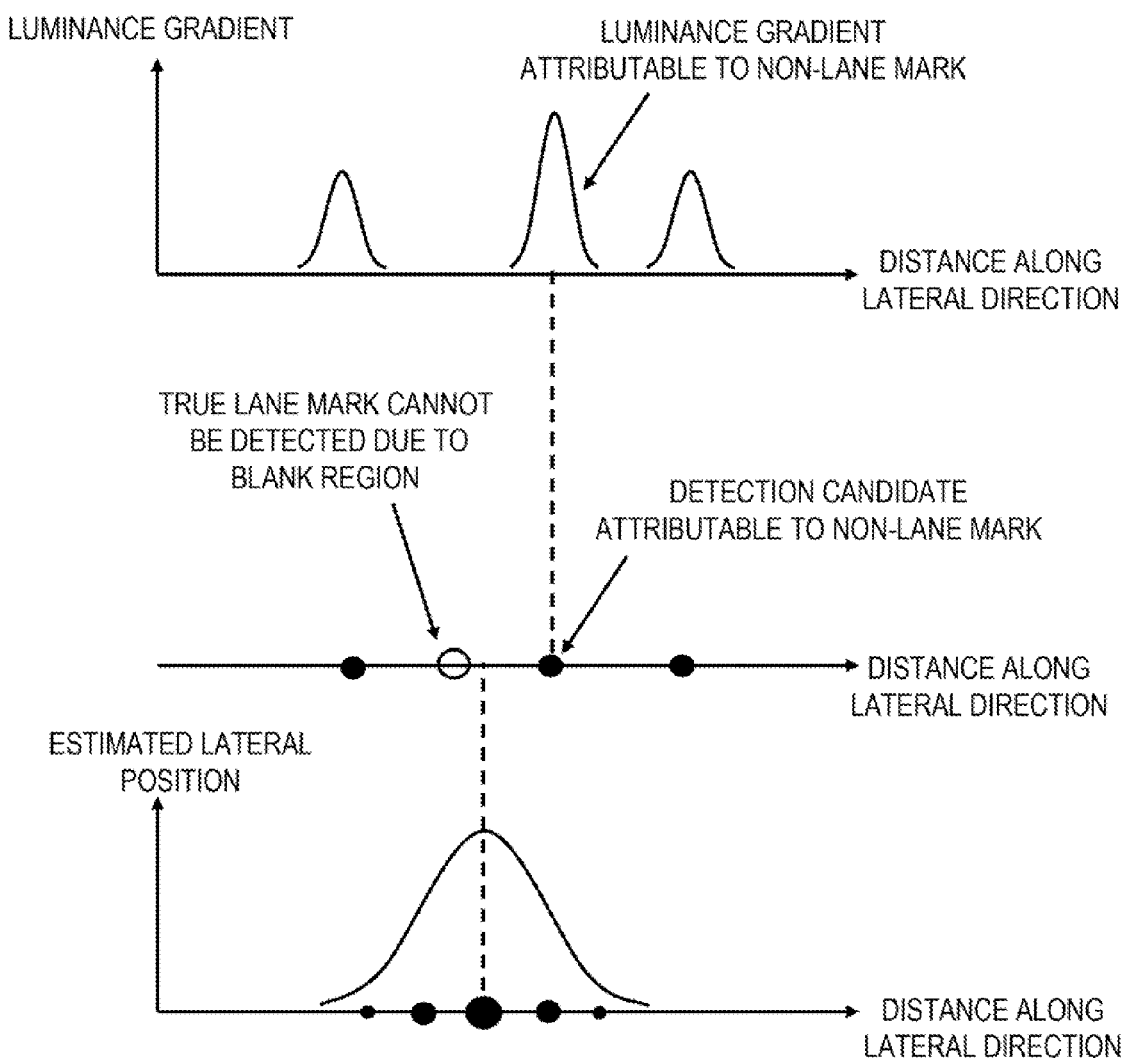
FIG. 12 shows, by way of a Comparative Example (related art example), a concrete example in which, if, in the situation shown in FIG. 11, just the estimation of the lateral boundary line position is relied upon, mistaken recognition is most likely to be produced.
Figure 13:
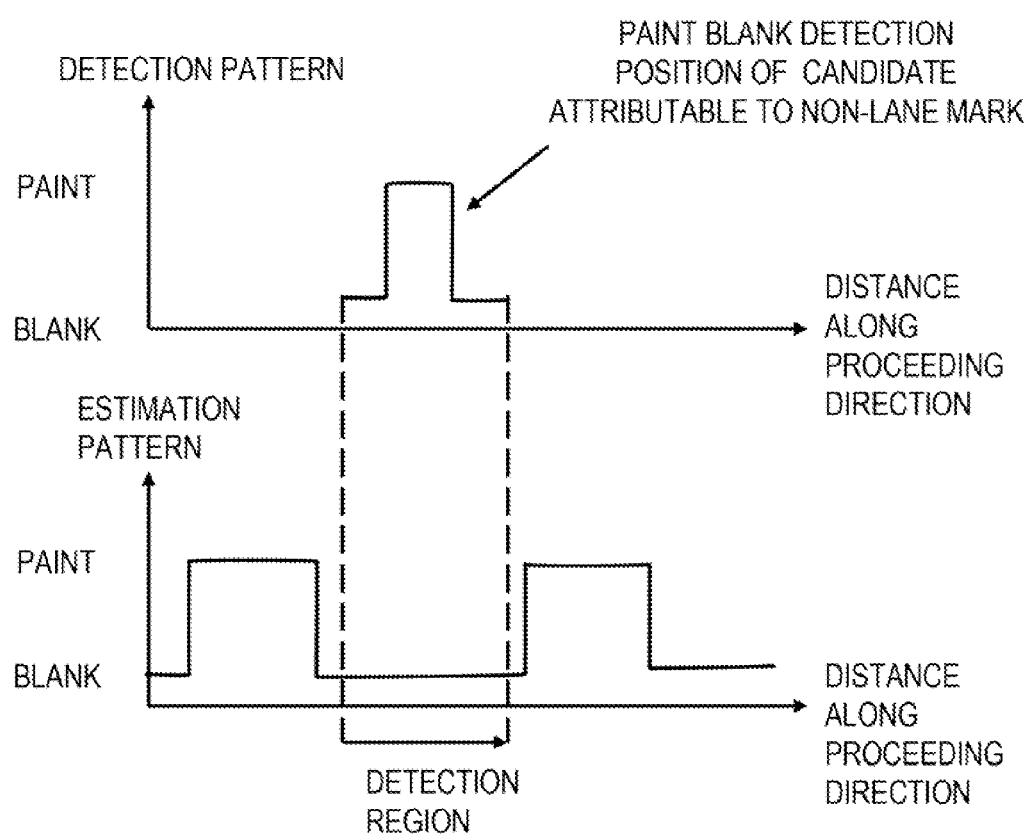
FIG. 13 shows that, in the situation shown in FIG. 11, the picture image processing apparatus according to Example 1 of the present invention is able to operate most beneficially.

For example, if there is a car running ahead or side-by-side, as in FIG. 11, there is a possibility with the conventional Example (comparative Example) that a false lane mark candidate is recognized to be a lane mark. In particular, in case where a painted region of a true lane mark is not represented (displayed) in a detection region of the current frame, there is a possibility that a site of high luminance gradient, attributable to the car running on a neighboring runway (lane), may be detected as a lane mark candidate, as in an Example of FIG. 12. If evaluation be made based solely upon the lateral positions, this candidate may be concluded to be a lane mark. In Example 1, however, evaluation is made using the estimation information of the paint-blank boundary line. Thus, referring to FIG. 13, the lane mark evaluation value of a false lane mark candidate, viz., if enables that a lane mark region, in which a true lane mark, is inherently a blank region, but which is mistakenly decided to be a painted region, is evaluated at a lower value to allow for verifying the lane mark candidate to be a non-lane mark.

The particular exemplary embodiments or examples may be modified or adjusted within the gamut of the entire disclosure of the present invention, inclusive of claims, based on the fundamental technical concept of the invention. Further, a variety of combinations or selection of elements disclosed herein may be made within the framework of the claims. Viz., the present invention may cover a wide variety of modifications or modifications that may occur to those skilled in the art in accordance with the entire disclosure of the present invention, inclusive of claim and the technical concept of the present invention.

EXPLANATION OF SYMBOLS

| | |
|---|---|
| 1 | car |
| 2 | picture image data processor (lane mark recognition device) |
| 10 | electronic controller |
| 11 | central processing unit (CPU) |
| 12, 13 | interfaces (I/Fs) |
| 14 | memory (Mem) |
| 15 | storage unit (DB) |
| 20 | picture image outputting device |
| 30 | car speed detector |
| 110 | picture image information acquisition function |
| 120 | car speed information acquisition function |
| 130 | storage function (memory) |
| 140 | paint-blank position estimation function (estimation unit) |
| 150 | candidate detection function (candidate detection unit) |
| 151 | lateral boundary line candidate detection function (lateral boundary line candidate detection unit) |
| 152 | paint-blank boundary line candidate detection function (paint-blank boundary line candidate detection unit) |
| 160 | verification function (verification unit) |
| 170 | result outputting function |
| 210 | painted region |
| 220 | blank region |
| 230 | lateral boundary (lateral boundary line) |
| 240 | paint-blank boundary (paint-blank boundary line) |
| 250 | length of the painted region |
| 260 | length of the blank region |

What is claimed is:

1. A picture image processing apparatus, comprising a candidate detection unit detecting a lateral boundary line candidate and a paint-blank boundary line candidate of a lane mark from picture image information acquired;

a verification unit verifying whether said lateral boundary line candidate and said paint-blank boundary line candidate, detected by said candidate detection unit, represent a lateral boundary line and a paint-blank boundary line of said lane mark, respectively;

a storage unit storing verification information from a verification unit, as hysteresis information including said lateral boundary line candidate and said paint-blank boundary line candidate, at a time at which said lateral boundary line candidate and said paint-blank boundary line candidate have been verified by said verification unit to be the lateral boundary line and the paint-blank boundary line of said lane mark, respectively; said storage unit also storing car speed information from a car speed detector correlated with said hysteresis information; and an estimation unit estimating, using said hysteresis information and said car speed information, positions of the lateral boundary line and the paint-blank boundary line in a next frame corresponding to picture image information which would be acquired next to current picture image information; wherein said storage unit memorizes the estimation information including the positions of the lateral boundary line and the paint-blank boundary line estimated by said estimation unit; and said verification unit executes verification using the estimation information memorized in said storage unit when verification occurs.

2. The picture image processing apparatus according to claim 1, wherein, said candidate detection unit comprises a lateral boundary line candidate detection unit detecting a set of said lateral boundary line candidates from said picture image information; and a paint-blank boundary line candidate detection unit detecting said paint-blank boundary line candidate from said picture image information in a region of said set of the lateral boundary line candidates detected by said lateral boundary line candidate detection unit.

3. The picture image processing apparatus according to claim 2, wherein, said lateral boundary line candidate detection unit calculates gradient(s) of luminance value(s) in said picture image information with the use of an edge filter;

said lateral boundary line candidate detection unit comparing absolute value(s) of said gradient(s) to a preset threshold value to extract, as edge points, a plurality of points in each of which the absolute values of said gradient are not less than said preset threshold value;

said lateral boundary line candidate detection unit extracting, by Hough transform, a plurality of approximate straight lines passing through said edge points as contacting points;

said lateral boundary line candidate detection unit executing preset evaluation processing on said approximate straight lines extracted to detect two of said approximate straight lines as said set of the lateral boundary line candidates;

said paint-blank boundary line candidate detection unit calculating gradient(s) of another luminance value(s) in said picture image information with the use of an edge filter;

said paint-blank boundary line candidate detection unit comparing an absolute value(s) of said gradient(s) to another preset threshold value to extract, as edge points, a plurality of points in each of which the absolute values of said gradient(s) are not less than said preset another threshold value;

extracting, from a proximal side, two of said approximate straight lines passing through said edge points as contacting points by Hough transform; and detecting said two approximate straight lines extracted as said paint-blank boundary line candidates.

4. The picture image processing apparatus according to claim 1, wherein, said verification unit compares the estimated positions of said lateral boundary line and said paint-blank boundary line in the estimation information memorized in said storage unit when verification occurs to the candidate position of said lateral boundary line candidate and said paint-blank boundary line candidate, respectively, to decide an evaluation value(s); said verification unit deciding whether said evaluation value(s) is not less than a further threshold value(s); said verification unit verifying said lateral boundary line candidate and said paint-blank boundary line candidate to be a lane mark in case said evaluation value(s) is not less than said further threshold value(s).

5. The picture image processing apparatus according to claim 4, wherein, said verification unit verifies said lateral boundary line candidate and said paint-blank boundary line candidate to be not a lane mark when said evaluation value(s) is less than said further threshold value(s).

6. The picture image processing apparatus according to claim 4, wherein, said verification unit executes verification by decreasing said threshold value(s) in case said verification results in keeping on to be not a lane mark despite a preset time has elapsed or the car has run a preset distance.

7. The picture image processing apparatus according to claim 4, wherein, said evaluation value is decided by normal distribution having said estimated position as μ;

said verification unit executing the verification by increasing a variance of said normal distribution in case said verification results in keeping on to be not a lane mark despite a preset time has elapsed or the car has run a preset distance.

8. The picture image processing apparatus according to claim 1, wherein, said storage unit memorizes advance information including a line width of a lane mark, a length of a painted region and a length of a blank region;

said verification unit executing the verification using said advance information in case no estimated information has been memorized in said storage unit at a time point of the verification.

9. A method for processing a picture image, comprising:

detecting a lateral boundary line candidate and a paint-blank boundary line candidate of a lane mark from picture image information acquired in a candidate detection unit;

verifying whether said lateral boundary line candidate and said paint-blank boundary line candidate detected represent a lateral boundary line and a paint-blank boundary line of said lane mark, respectively in a verification unit;

storing verification information from the verification unit, as hysteresis information including said lateral boundary line candidate and said paint-blank boundary line candidate, at a time at which said lateral boundary line candidate and said paint-blank boundary line candidate have been verified to be the lateral boundary line and the paint-blank boundary line of said lane mark, respectively; also storing car speed information from a car speed detector correlated with said hysteresis information in a storage unit;

estimating, using said hysteresis information and said car speed information, positions of the lateral boundary line and the paint-blank boundary line in a next frame corresponding to picture image information which would be acquired next to current picture image information in an estimation unit;

storing the estimation information including the positions in the next frame of the lateral boundary line and the paint-blank boundary line estimated in the storage unit; and executing verification using the estimation information memorized at a time point of said verification in verifying whether or not the lateral boundary line candidate and said point-blank boundary line candidate represent the lateral boundary line and the paint-blank boundary line of said lane mark, respectively in the verification unit.

10. The method for processing a picture image according to claim 9, further comprising, in verifying whether or not said lateral boundary line candidate and said paint-blank boundary line candidate are a lateral boundary line and a paint-blank boundary line of said lane mark, respectively in the candidate detection unit:

detecting a set of said lateral boundary line candidates from said picture image information in the candidate detection unit; and detecting said paint-blank boundary line candidate from said picture image information in a region of said set of said lateral boundary line candidates detected in the candidate detection unit.

11. The method for processing a picture image according to claim 10, further comprising, in detecting said set of the lateral boundary line candidates in the candidate detection unit:

calculating a gradient of a luminance value in said picture image information with the use of an edge filter in the candidate detection unit;

comparing an absolute value of said gradient to a preset threshold value to extract, as edge points, a plurality of points in each of which absolute values of said gradient are not less than said preset threshold value in the candidate detection unit;

extracting, by Hough transform, a plurality of approximate straight lines passing through said edge points as contacting points in the candidate detection unit; and executing preset evaluation processing on said approximate straight lines extracted to detect two of said approximate straight lines as said set of the lateral boundary line candidates in the candidate detection unit;

said method further comprising, in detecting said paint-blank region boundary candidate in the candidate detection unit:

calculating a gradient of another luminance value in said picture image information with the use of an edge filter in the candidate detection unit;

comparing an absolute value of said gradient to another preset threshold value to extract, as edge points, a plurality of points in each of which absolute values of said gradient are not less than said another preset threshold value in the candidate detection unit;

extracting, from a proximal side, two of a plurality of approximate straight lines passing through said edge points as contacting points by Hough transform in the candidate detection unit; and detecting said two approximate straight lines extracted as said paint-blank boundary line candidates in the candidate detection unit.

12. The method for processing a picture image according to claim 9, in verifying whether or not said lateral boundary line candidate and said paint-blank boundary line candidate are a lateral boundary line and a paint-blank boundary line of said lane mark, respectively in the verification unit, further comprising:

comparing estimated positions of said lateral boundary line and said paint-blank boundary line in estimation information memorized when verification occurs to candidate positions of said lateral boundary line candidate and said paint-blank boundary line candidate to decide an evaluation value, respectively in the verification unit;

deciding whether or not said evaluation value(s) is not less than a further threshold value in the verification unit; and verifying said lateral boundary line candidate and said paint-blank boundary line candidate to be a lane mark, respectively, in case said evaluation value(s) is not less than said further threshold value in the verification unit.

13. The method for processing a picture image according to claim 12, in verifying whether or not said lateral boundary line candidate and said paint-blank boundary line candidate are a lateral boundary line and a paint-blank boundary line of a lane mark, respectively in the verification unit, further comprising:

verifying said lateral boundary line candidate and said paint-blank boundary line candidate to be not a lane mark when said evaluation value(s) is less than said further threshold value in the verification unit.

14. The method for processing a picture image according to claim 12, in verifying whether or not said lateral boundary line candidate and a paint-blank boundary line candidate are a lateral boundary line or a paint-blank boundary line of a lane mark, respectively in the verification unit, further comprising:

executing verification by decreasing said threshold value in case said verification results in keeping on to be not a lane mark despite a preset time has elapsed or the car has run a preset distance in the verification unit.

15. The method for processing a picture image according to claim 12, wherein, said evaluation value is decided by normal distribution that has said estimated position as $\mu$; said method further comprising, in verifying whether or not said lateral boundary line candidate and a paint-blank boundary line candidate are a lateral boundary line or a paint-blank boundary line of a lane mark, respectively:

executing the verification by increasing variance of said normal distribution in case said verification results in keeping on to be not a lane mark despite a preset time has elapsed or the car has run a preset distance in the verification unit.

16. The method for processing a picture image according to claim 9, in verifying whether said lateral boundary line candidate and said paint-blank boundary line candidate are a lateral boundary line and a paint-blank boundary line of a lane mark, respectively, further comprising:

executing verification using advance information including a line width of a lane mark, a length of a painted region and a length of a blank region in the verification unit in case no estimated information has been memorized at a time point of the verification in the storage unit.

17. A non-transient recording medium on which a program for processing a picture image is recorded; said program allowing a computer to execute:

processing of detecting a lateral boundary line candidate and a paint-blank boundary line candidate of a lane mark from picture image information acquired in a candidate detection unit;

processing of verifying whether or not said lateral boundary line candidate and said paint-blank boundary line candidate detected represent a lateral boundary line and a paint-blank boundary line of said lane mark, respectively in a verification unit;

processing of storing verification information from the verification unit, as hysteresis information; said verification information including said lateral boundary line candidate and said paint-blank boundary line candidate at a time at which said lateral boundary line candidate and said paint-blank boundary line candidate have been verified to be a lateral boundary line and a paint-blank boundary line of said lane mark, respectively; and also storing car speed information from a car speed detector correlated with said hysteresis information in a storage unit;

processing of estimating, using said hysteresis information and said car speed information, positions of the lateral boundary line and the paint-blank boundary line in a next frame corresponding to picture image information which would be acquired next to a current picture image information in an estimation unit; and processing of storing the estimation information including positions of the lateral boundary line and the paint-blank boundary line of the next frame estimated in the storage unit; wherein, in verifying whether or not said lateral boundary line candidate and said paint-blank boundary line candidate detected represent a lateral boundary line and a paint-blank boundary line of said lane mark, respectively, the estimation information memorized at a time point of said verifying is used for executing the verification in the verification unit.

18. The non-transient recording medium on which the program for processing a picture image is recorded according to claim 17, further allowing, in verifying whether or not the lateral boundary line candidate and said paint-blank boundary line candidate are a lateral boundary line and a paint-blank boundary line of said lane mark, respectively in the candidate detection unit, a computer to execute the processings of:

detecting a set of said lateral boundary line candidates from said picture image information in the candidate detection unit; and detecting said paint-blank region boundary candidate from said picture image information in a region of said set of said lateral boundary line candidates detected in the candidate detection unit.

19. The non-transient recording medium on which the program for processing a picture image is recorded according to claim 18, further allowing, in detecting said set of the lateral boundary line candidates in the candidate detection unit, a computer to execute the processings of:

calculating a gradient of a luminance value in said picture image information with the use of an edge filter in the candidate detection unit;

comparing an absolute value of said gradient to a preset threshold value to extract, as edge points, a plurality of points in each of which the absolute values of said gradient are not less than said preset threshold value in the candidate detection unit;

extracting, by Hough transform, a plurality of approximate straight lines passing through said edge points as contacting points in the candidate detection unit; and performing preset evaluation processing on said approximate straight lines extracted to detect two of said approximate straight lines as said set of the lateral boundary line candidates in the candidate detection unit;

said program further allowing, in detecting said paint-blank region boundary candidate in the candidate detection unit, a computer to execute the processings of:

calculating a gradient of another luminance value in said picture image information with the use of an edge filter in the candidate detection unit;

comparing an absolute value of said gradient to another preset threshold value to extract, as edge points, a plurality of points in each of which the absolute value(s) of said gradient is not less than said another preset threshold value in the candidate detection unit;

extracting, from a proximal side, two of approximate straight lines passing through said edge points as contacting points by Hough transform in the candidate detection unit; and detecting said two approximate straight lines extracted as said paint-blank boundary line candidates in the candidate detection unit.

20. The non-transient recording medium on which the program for processing a picture image is recorded according to claim 17, further allowing, in verifying whether or not said lateral boundary line candidate and said paint-blank boundary line candidate are a lateral boundary line or a paint-blank boundary line of said lane mark, respectively in the verification unit, a computer to execute the processings of:

comparing estimated positions of said lateral boundary line or said paint-blank boundary line in the estimation information memorized when verification occurs with candidate positions of said lateral boundary line candidate and said paint-blank boundary line candidate to decide an evaluation value(s) in the verification unit;

deciding whether or not said evaluation value(s) is not less than a further threshold value in the verification unit; and verifying said lateral boundary line candidate and said paint-blank boundary line candidate to be a lane mark in case said evaluation value(s) is not less than said further threshold value in the verification unit.

21. The non-transient recording medium on which the program for processing a picture image is recorded according to claim 20, further allowing, in verifying whether or not said lateral boundary line candidate and said paint-blank boundary line candidate are a lateral boundary line and a paint-blank boundary line of a lane mark, respectively in the verification unit, a computer to execute the processing of:

verifying said lateral boundary line candidate and said paint-blank boundary line candidate to be not a lane mark when said evaluation value(s) is less than said further threshold value in the verification unit.

22. The non-transient recording medium on which the program for processing a picture image is recorded according to claim 20, further allowing, in verifying whether or not said lateral boundary line candidate and said paint-blank boundary line candidate are a lateral boundary line and a paint-blank boundary line of a lane mark, respectively in the verification unit, a computer to execute the processings of:

performing verification by decreasing said threshold value in case said verification results in keeping on to be not a lane mark despite a preset time has elapsed or the car has run a preset distance in the verification unit.

23. The non-transient recording medium on which the program for processing a picture image is recorded according to claim 20, wherein, said evaluation value is decided by normal distribution having said estimated position as $\mu$; said program further allowing, in verifying whether or not said lateral boundary line candidate and said paint-blank boundary line candidate are a lateral boundary line or a paint-blank boundary line of a lane mark, respectively, a computer to execute the processing of:

performing verification by increasing a variance of said normal distribution in case said verification results in keeping on to be not a lane mark despite a preset time has elapsed or the car has run a preset distance in the verification unit.

24. The non-transient recording medium on which the program for processing a picture image is recorded according to claim 17, further allowing a computer, in verifying whether or not said lateral boundary line candidate and a paint-blank boundary line candidate are a lateral boundary line or a paint-blank boundary line of a lane mark, respectively, to execute the processing of:

performing verification using advance information including a line width of a lane mark, a length of a painted region in the verification unit and a length of a blank region in case no estimated information has been memorized at a time point of the verification in the storage unit.

* * * * *